(12) United States Patent
Arat et al.

(10) Patent No.: US 12,710,971 B2
(45) Date of Patent: Aug. 18, 2026

(54) DIGITAL CHARACTER INTERACTIONS WITH MEDIA ITEMS IN A CONVERSATIONAL SESSION

(71) Applicant: HIA Technologies, Inc., La Crescenta, CA (US)

(72) Inventors: Vacit Arat, La Cañada Flintridge, CA (US); Rick King, Kiowa, CO (US); Arnav Mukherjee, Lexington, MA (US); Bobbi Jolean Sheffield, Rockwall, TX (US)

(73) Assignee: HIA Technologies, Inc., La Crescenta, CA (US)

( * ) Notice: Subject to any disclaimer, the term of this patent is extended or adjusted under 35 U.S.C. 154(b) by 0 days.

(21) Appl. No.: 18/322,134

(22) Filed: May 23, 2023

(65) Prior Publication Data

US 2024/0394077 A1 Nov. 28, 2024

(51) Int. Cl.
*G06F 9/451* (2018.01)
*G06F 3/16* (2006.01)
*G06T 13/40* (2011.01)

(52) U.S. Cl.
CPC .............. *G06F 9/453* (2018.02); *G06F 3/167* (2013.01); *G06T 13/40* (2013.01)

(58) Field of Classification Search
CPC .......... G06F 9/453; G06F 3/167; G06T 13/40
USPC .................................................. 715/705, 706
See application file for complete search history.

(56) References Cited

U.S. PATENT DOCUMENTS 9,667,786 B1 5/2017 Dube
9,812,151 B1 11/2017 Amini et al.
10,181,213 B2 1/2019 Bullivant et al.
11,303,851 B1 * 4/2022 Kasaba .................. G06F 3/017
11,317,061 B1 * 4/2022 Kasaba .................. G06F 3/017
2002/0065682 A1 5/2002 Goldenberg
(Continued)

FOREIGN PATENT DOCUMENTS

WO WO-2022175814 A1 * 8/2022

OTHER PUBLICATIONS

Treasury Wine Estates, www.LivingWineLabels.com, Website, Nov. 15, 2019, 17 pages,Retrieved from the Internet: https://www.livingwinelabels.com/.

*Primary Examiner* — Stephen S Hong
*Assistant Examiner* — Broderick C Anderson
(74) *Attorney, Agent, or Firm* — Lee Sullivan Shea & Smith LLP

(57) ABSTRACT

A computing system is configured to perform operations including: (i) causing a graphical user interface (GUI) of a content authoring tool for creating a visual conversation application to be presented via a first device, the GUI comprising one or more media interactions for a digital character configured to interact with a user in a conversational session of the visual conversation application, (ii) receiving, from the first device, an indication of a media item to be presented in the conversational session, (iii) receiving, from the first device, an indication of a media interaction of the one or more media interactions, the media interaction comprising a type of engagement of the digital character with the media item, and (iv) causing the conversational session to be presented via a second device, wherein the digital character is configured to engage with the media item in accordance with the media interaction during the conversational session.

20 Claims, 10 Drawing Sheets

(56) References Cited

U.S. PATENT DOCUMENTS

| | | | | |
|---|---|---|---|---|
| 2009/0004633 | A1 | 1/2009 | Johnson et al. | |
| 2009/0327899 | A1* | 12/2009 | Bress | G06Q 10/10<br>715/757 |
| 2012/0066270 | A1 | 3/2012 | Kravets | |
| 2014/0074454 | A1* | 3/2014 | Brown | G10L 15/08<br>704/235 |
| 2014/0278403 | A1* | 9/2014 | Jacob | G06T 13/40<br>704/235 |
| 2017/0098051 | A1 | 4/2017 | Balram | |
| 2017/0132828 | A1 | 5/2017 | Zelenin et al. | |
| 2017/0206797 | A1* | 7/2017 | Solomon | G06N 3/006 |
| 2017/0354383 | A1 | 12/2017 | Odessky et al. | |
| 2018/0114527 | A1 | 4/2018 | Zilotti et al. | |
| 2018/0114528 | A1 | 4/2018 | Yasavur et al. | |
| 2018/0144738 | A1 | 5/2018 | Yasavur et al. | |
| 2018/0197322 | A1 | 7/2018 | Sagar et al. | |
| 2019/0172242 | A1 | 6/2019 | Bullivant et al. | |
| 2020/0319860 | A1* | 10/2020 | Arat | G06T 7/73 |
| 2023/0215067 | A1* | 7/2023 | Silverstein | G06F 3/013<br>345/473 |

* cited by examiner

DIGITAL CHARACTER INTERACTIONS WITH MEDIA ITEMS IN A CONVERSATIONAL SESSION

BACKGROUND

Software applications that allow users to interact with a digital character in conversational sessions is an emerging field of technology that offers a wide array of utility. These software applications range in utility from providing helpful information in response to asked questions, to teaching a variety of subjects, to conducting interviews (such as screening interviews), among other possibilities. Further, the use of a digital character configured to interact with a user during such conversational sessions can help users engage in the ingestion of information in a more impactful way than through other more passive means of ingesting information (e.g., reading an article or viewing a tutorial video), which may in turn lead to increased information retention. However, there are various challenges inherent with the creation and maintenance of digital characters that interact with users in a conversational session in ways that encourage engagement and information retention. Accordingly, there is a need to develop technologies that improve digital characters' ability to interact with users in these ways.

Overview

As mentioned, the use of a digital character configured to interact with a user during a conversational session has many uses and can help users engage in the ingestion of information in an impactful way, which may in turn lead to increased information retention. However, there may be various challenges that are inherent with the creation and maintenance of digital characters that are configured to interact with users in a conversational session.

As one example, the technology of today has several shortcomings for improving the interaction model between users and digital characters. As a consequence, users may lose interest in interacting with digital characters, as the experience may not be as immersive as users may desire. Some progress in this technology space has been made, specifically in improving how digital characters' facial reactions to certain conversational content approximate reality. This may help improve the interaction model, and users may observe and appreciate a digital character's ability to react to certain conversational content through their facial features in a manner that suggests an emotional "understanding" of the conversational content.

Another area of improvement in the interaction model between users and digital characters is the quality of the conversational content that digital characters may be configured to speak at certain points in time during a conversational session with a user. As the quality of the conversational content that digital characters may be configured to speak continues to improve (e.g., by increasing the accuracy of information that is dispensed by digital characters, by increasing the relevance of information that is dispensed by digital characters to topics of conversation that the digital character may be engaged in with users, among other possibilities), users may gain further confidence in the utility of digital characters.

One area that has seen less improvement in the interaction model between users and digital characters is the ability of a digital character to interact with media items that may be present along with the digital character in a conversational session. For example, in a conversational session that includes a digital character and a media item having the form of a visual representation of a presentation slide containing information of a certain topic, such as COVID-19, the interaction model between the user and the digital character may be improved by configuring the digital character to interact with the presentation slide in intelligent ways over the course of a conversational session with a user. As one example, in response to a question asked by the user, it would be beneficial for the digital character to be able to, while providing an answer to the question asked, point to a portion of the presentation slide that contains content that corresponds to the answer. This would create a more immersive experience for the user by observing the digital character interact with the presentation slide in intelligent ways over the course of the conversational session.

However, prior attempts to create such an intelligent digital character have fallen short. For instance, the digital characters in use today may be placed adjacent to media items within a visual conversation application, but it is currently very difficult to have the digital characters interact with the media items in a way that accurately mimics a human. It takes animation expertise to coordinate the actions of a digital character with elements of media items (e.g., by having the digital character point to a portion of a visual representation of a presentation slide that contains information relevant to certain content spoken by the digital character, or asked by a user of the visual conversation application during a conversational session), and if the media item is changed, or if the digital character is to be configured to interact with a media item in a different way, perhaps based on user interaction during a conversational session, then the digital character's actions need to be re-developed. The process of re-developing digital characters to interact with media items in different ways may be time consuming and tedious for animators to accomplish. Further, the current level of animation expertise required to coordinate digital character actions with elements of media items makes it difficult for users, who may come from a variety of professional backgrounds, to coordinate digital character actions for visual conversation applications they may desire to create, among various other challenges.

In view of the aforementioned issues, disclosed herein is a new technology for a content authoring tool that enables users of the content authoring tool to create a visual conversation application including an interactive digital character capable of engaging both an end user directly and interacting with media items presented throughout a conversational session of the visual conversation application.

The creation of a visual conversation application using a content authoring tool as discussed herein may take various forms, but in general will begin with an authoring phase. In the authoring phase, one or more views of a graphical user interface (GUI) of the content authoring tool may be presented via a computing device to allow users (e.g., a doctor or other medical professional, a banker or other financial professional, etc.) to create a visual conversation application that may be relevant to their given profession or industry.

The process of creating a visual conversation application utilizing the content authoring tool includes creating (or selecting from a list of digital characters) a digital character and providing conversational content for the digital character to speak in conversational sessions with users of the visual conversation application in various ways. These may include, for example, presenting information on a topic, answering questions from the users when asked, and/or asking questions to the users. Further, the digital character may be configured to speak these different types of conversational content in various tones, etc.

Further, the user of the content authoring tool may configure the digital character to move in a manner (e.g., pre-programmed, manually triggered, AI-driven, etc.) consistent with the conversational content. Further details regarding ways that a user can create a digital character are discussed in U.S. Pat. No. 11,204,743, which is incorporated by reference in its entirety.

The content authoring tool may further enable a user to add media items to the visual conversation application, such as visual representations of presentation slides, various 2D or 3D objects, additional digital characters, etc. These media items, depending on their form, may include content relevant to topics of conversation that the digital character may engage in, which may, for example, be associated with the profession of the user. For example, a doctor creating a visual conversation application for his practice may include a visual representation of a presentation with slides related to common illnesses. Various other examples also exist.

In practice, media items that the user may add to the visual conversation application may take any of various forms.

One possible form that a media item may take is a visual representation of a presentation slide deck, which may comprise one or more presentation slides. A presentation slide may itself comprise various sub-media item components, such as text, images, diagrams, videos, 2D or 3D objects, and animated digital characters, among other things.

Another possible form that a media item may take is a visual representation of a television, tablet, or other device capable of presenting video. Such a media item may be capable of presenting video (and perhaps audio) related to various topics that may be relevant to a profession of a user utilizing the content authoring tool.

Yet another possible form that a media item may take is a visual representation of a whiteboard, chalkboard, notebook, or other material that may contain information, such as text, images, among other examples.

Yet still another possible form that a media item may take is a visual representation of an additional digital character.

As may be appreciated, media items may take any of various other forms for conveying textual, video, audio, and other types of information via the visual conversation application, in addition to those described.

Further, a media item (e.g., a presentation slide, a device capable of presenting video, a material containing information, an additional digital character, etc.) may be presented in various contexts of the visual conversation application. As one example, a media item may be presented in the context of a virtual reality setting. As another example, a media item may be presented in the context of an augmented reality setting. In such a context, a media item may be a visual representation of a physical object of the real world that is within the view of a camera of a computing device running a conversational session of the visual conversation application.

The content authoring tool may comprise various views that a user may navigate to configure the digital character to engage with media items added by the user according to certain media interactions that may be selected by the user. The various views of the content authoring tool may provide a convenient way for the user to select any of various media interactions to configure the digital character to perform when interacting with a media item during a conversational session of a visual conversation application.

As may be appreciated, the media interactions that a user may configure the digital character to perform when interacting with a media item during a conversational session of a visual conversation application may take any of various forms.

As one possibility, a digital character may be configured to perform a media interaction taking the form of pointing to a certain portion of a media item that may be present along with the digital character in a conversational session of a visual conversation application. For example, the digital character may be configured to "point" to certain text or images present on a media item taking the form of a visual representation of a presentation slide, television, whiteboard, etc.

Further, the digital character may be configured to point to a certain portion of the media item in various ways. As one example, the digital character may use its hand to point to a certain portion of the media item. As another example, the digital character may grab a visual representation of a ruler, stick, or other object that may be present along with the digital character and the media item in the conversational session and point the object to a certain portion of the media item. As yet another example, the digital character may utilize a visual representation of a laser pointer or the like that may be present along with the digital character and the media item in the conversational session to point to a certain portion of the media item. Various other examples may also exist.

As another possibility, a digital character may be configured to perform a media interaction taking the form of manipulating a media item that may be present with the digital character in a conversational session of a visual conversation application in some way. As one example, where the media item is a visual representation of a presentation slide deck, the digital character may manipulate the media item by changing a visual representation of a presentation slide that is being presented by the media item. The digital character may do this by utilizing a visual representation of a clicker, a visual representation of a laptop controlling the presentation slide deck, or the like that may be present with the digital character and the media item in the conversational session. As may be appreciated, the digital character may change a presentation slide that is being presented by the presentation slide deck in various other ways.

As another example, where the media item comprises a visual representation of a presentation slide, a chalkboard, a whiteboard, a notebook, or other the like, the digital character may manipulate the media item by editing content that is presented by the media item. For instance, the digital character may manipulate the media item in this way by highlighting certain content presented via the media item, underlining certain content presented via the media item, writing/drawing additional content onto the media item, erasing/deleting certain content presented via the media item, among various other ways in which the digital character may manipulate the media item in this way.

As yet another example, where the media item comprises a visual representation of a device capable of presenting video (and possibly audio) content, the digital character may manipulate the media item by editing the video (and possibly audio) content that may be presented via the media item. For instance, the digital character may manipulate the media item in this way by rewinding/fast-forwarding/pausing/resuming/powering on/powering off/etc. content that is being presented (e.g., visually, audibly, or both) via the media item. The digital characters may undertake the manipulation via a visual representation of "buttons" of the media item, via a visual representation of a controller such as a remote, among various other possibilities.

As yet still another example, the digital character may manipulate the media item by handling the media item in various ways. For instance, the digital character may handle the media item by initially bringing the media item into view of the conversational session, possibly by wheeling in the media item from off-screen into view of the conversational session, among various other possibilities. The digital character may also handle the media item by rotating it, picking it up, setting it down on a surface, among other possibilities.

In some implementations, the digital character may handle the media item based on user interactions during the conversational session of the visual conversation application. As one option, the digital character may bring the media item into view of the conversational session along with several other media items, offer the various media items to a user of the visual conversation application for selection, acknowledge which media item is selected by the user of the visual conversation application, and then remove the unselected media items from view of the conversational session. As may be appreciated, there may be various other options for how the digital character may handle media items in a conversational session of the visual conversation application based on user interactions during the conversational session.

As another example, where the media item comprises a visual representation of a 2D digital character that is part of another media item (e.g., a visual representation of a 2D digital character within a visual representation of a presentation slide, a visual representation of a 2D digital character within a video presented via a visual representation of a computing device, etc.), the digital character of the conversational session may manipulate the 2D digital character by "pulling" the 2D digital character out of the presentation slide/video to join the digital character as a 3D-rendered digital character. As another example, the digital character may manipulate the 3D-rendered digital character by "returning" the 3D-rendered digital character back into its original 2D form.

As yet another example, where the media item comprises a visual representation of a presentation slide, a visual representation of a computing device presenting video, or the like, the digital character may manipulate the media item by "jumping into" the visual representation of the presentation slide or the video as a 2D-rendered digital character. The digital character may then be configured to interact with additional digital characters that may be part of the presentation slide or the video, as well as other sub-media items that may be part of the presentation slide or the video, for example by speaking to them, handling them in some manner (such as previously described), among various other possibilities. The digital character may further be configured to "jump out" of the presentation slide/video, returning to its 3D-rendered form. Further details regarding technology that may facilitate various manners in which a digital character may manipulate a media item are discussed in U.S. Pat. No. 11,494,168, which is incorporated by reference in its entirety.

A digital character may be configured to perform numerous other media interactions as well, such as, for example, (i) performing a voiceover for media (e.g., text) that is presented via the media item, (ii) translating content that is presented via the media item, for example by signing (e.g., in ASL) content that is presented via the media item, among various other translations, (iii) acting out example actions that are described via the media item, such as by showing how to perform a certain medical procedure that is described in a presentation slide, among various other examples, and (iv) walking over from one media item to a second media item to interact with certain content that is presented via the second media item in some way, in which case a view of the visual conversation application may adjust (e.g., pan) to follow the digital character as it moves around the "space" of the visual conversation application during the conversational session. Further, in instances where the digital character acts as a voiceover for media that is presented via the media item, the digital character's utterances may be timed to be delivered in synchrony with the media presented via the media item, when applicable.

Further yet, in instances where the digital character signs content, the digital character may transition from signing the content to speaking the content and/or performing some other interaction (e.g., a hand point). When the digital character transitions from signing the content to speaking the content, a different media item present with the digital character in the conversational session of the visual conversation application may present an alternative (e.g., a different digital character, video of a person) that continues signing the content spoken by the digital character.

As may be appreciated, the example forms that a media interaction that a digital character may be configured to perform while interacting with a media item described are not intended to be exhaustive. Indeed, a user may configure a digital character to perform any variation of the media interactions described, as well as various other types of media interactions during a conversational session of a visual conversation application.

In some further implementations, the user may configure a digital character to perform a media interaction such as speaking certain content in certain ways. For example, the user may have the ability to adjust a manner in which the digital character pronounces certain content, a manner in which the digital character pauses at various times while speaking certain content, among other things. As may be appreciated, the manner in which a digital character speaks certain content may itself be considered to be a form of media interaction.

Further yet, as may be appreciated, the user may configure a digital character to engage with a media item according to any of the described media interactions based on a trigger condition, which may take any of various forms. One possible trigger condition may take the form of a user of the visual conversation application asking a question to the digital character during a conversational session of the visual conversation application. Another possible trigger condition may take the form of the user of the visual conversation application mentioning a given topic during a conversational session of the visual conversation application. Yet another possible trigger condition may take the form of the user of the visual conversation application directing the digital character to engage with a media item present during the conversational session of the visual conversation application. Yet still another possible trigger condition may take the form of the user selecting a target location within the conversational session of the visual conversation application for a media interaction of the digital character. This may be accomplished via an input (e.g., a mouse click, a touch on a touch screen, a voice input) indicating a portion of a display of a computing device that is running the visual conversation application, among various other possibilities.

In a rendering phase, one or more views of a graphical user interface (GUI) of the visual conversation application may be presented via an end-user computing device. This may allow users of the visual conversation application to interact with a digital character of the visual conversation application in a conversational session of the visual conversation application.

Over the course of the conversational session of the visual conversation application, the digital character may interact with (i) the user of the end-user computing device, as well as (ii) one or more media items present during the conversational session of the visual conversation application in accordance with the manner in which the user of the content authoring tool created the visual conversation application.

Accordingly, in one aspect disclosed here is a method performed by a computing system that involves (i) causing a graphical user interface (GUI) of a content authoring tool for creating a visual conversation application to be presented via a first computing device, the GUI comprising one or more selectable media interactions for a digital character, wherein the digital character is configured to interact with a user in a conversational session of the visual conversation application, (ii) receiving, from the first computing device, an indication of a media item to be presented in the conversational session of the visual conversation application, (iii) receiving, from the first computing device, an indication of a given media interaction of the one or more selectable media interactions, wherein the given media interaction comprises a type of engagement of the digital character with the media item, and (iv) causing the conversational session to be presented via the second computing device, wherein the digital character is configured to engage with the media item in accordance with the given media interaction during the conversational session.

In another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable storage medium provisioned with software that is executable to cause a computing system to carry out the functions disclosed herein, including but not limited to the functions of the foregoing method.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE SYSTEM CONFIGURATION

As described above, the present disclosure is generally directed to software technology for facilitating a conversational session of a visual conversation application between a second user (e.g., a client, a patient, etc.) and a digital character configured to interact with both the second user as well as with media items that are present in the conversational session. At a high level, the disclosed software technology enables a first user (e.g., a professional such as a doctor, lawyer, etc.) to create a visual conversation application that includes a digital character that is configured to interact with the second user (e.g., a client, a patient, etc.), as well as with media items (e.g., presentation slides, additional digital characters, visual representations of computing devices presenting videos, etc.) that are presented along with the digital character during a conversational session of the visual conversation application. For example, during a given conversational session of the visual conversation application created by the first user, a given digital character may interact with the second user by responding to a question asked by the second user both by answering the question asked as well as by pointing to relevant portions of a media item present during the conversational session, such as a presentation slide containing information relevant to the asked question. As discussed herein, various other example interactions and example media items are possible as well.

Figure 1:
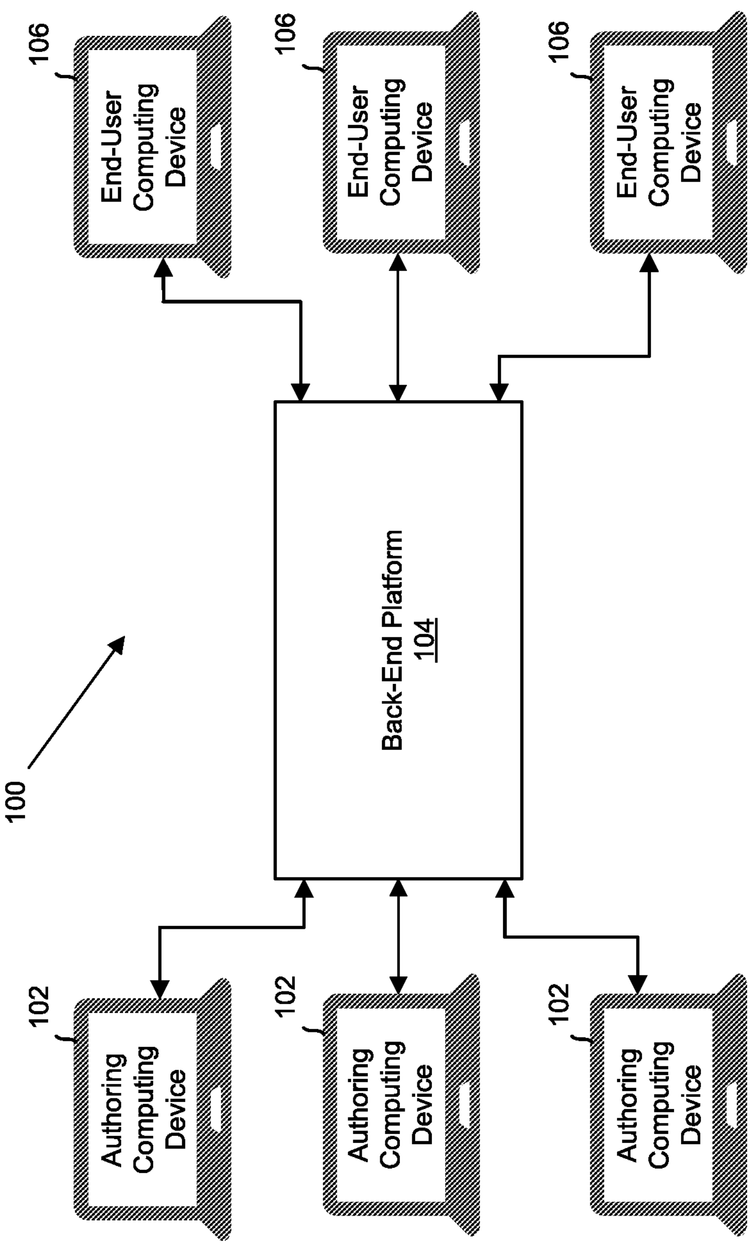
FIG. 1 is a simplified block diagram that illustrates an example network in which the disclosed technology may be implemented.

Turning now to FIG. 1 a simplified block diagram is provided that illustrates an example network environment 100 in which the disclosed technology may be implemented. As shown in FIG. 1, the example network environment 100 may include a plurality of authoring computing devices 102, a back-end platform 104, and a plurality of end-user computing devices 106. Further, it should be understood that an authoring computing device may also act as an end-user computing device in other contexts. Similarly, an end-user computing device may also act as an authoring computing device in other contexts.

In general, the back-end platform 104 may comprise one or more computing systems that have been provisioned with software for carrying out one or more of the platform functions disclosed herein for driving the content authoring tool and/or the visual conversation application created by the first user via the content authoring tool. The one or more computing systems of the back-end platform 104 may take various forms and may be arranged in various manners.

For instance, as one possibility, the back-end platform 104 may comprise computing infrastructure of a public, private, and/or hybrid cloud-based system (e.g., computing and/or storage clusters) that has been provisioned with software for carrying out one or more of the platform functions disclosed herein. In this respect, the entity that owns and operates the back-end platform 104 may either supply its own cloud infrastructure or may obtain the cloud infrastructure from a third-party provider of "on demand" computing resources, such as, for example, Amazon Web Services (AWS) or the like. As another possibility, the back-end platform 104 may comprise one or more dedicated servers that have been provisioned with software for carrying out one or more of the platform functions disclosed herein.

In practice, the back-end platform 104 may be capable of serving multiple different parties (e.g., organizations) that have signed up for access to the content authoring tool, where each such party has its own respective account for the content authoring tool. Further, in practice, a respective visual conversation application created by a first user (e.g., a doctor) via the content authoring tool using one of the authoring computing devices 102 may be later accessed by a second user (e.g., a patient) who has permission to access the respective visual conversation application, in which case the respective visual conversation application may include a front-end software component (e.g., a dedicated application, a web-based tool, etc.) running on one of the end-user computing devices 106 which may be available to the second user, as well as a back-end software component running on the back-end platform 104 that is accessible to the end-user computing device 106 via a communication network such as the Internet.

Further, other implementations of the back-end platform 104 are possible as well.

Turning next to the authoring computing devices, the one or more authoring computing devices 102 may generally take the form of any computing device that is capable of running front-end software (e.g., a dedicated application, a web-based tool, etc.) for accessing and interacting with the back-end platform 104, such as front-end software for using the content authoring tool to create a visual conversation application. In this respect, the authoring computing devices 102 may include hardware components such as one or more processors, data storage, one or more communication interfaces, and I/O components, among other possible hardware components, as well as software components such as operating system software and front-end software that is capable of interfacing with the back-end platform 104. As representative examples, the authoring computing devices 102 could be any of a smartphone, a tablet, a laptop, or a desktop computer, among other possibilities, and it should be understood that different authoring computing devices 102 could take different forms (e.g., different types and/or models of computing devices).

Turning now to the end-user computing devices, the one or more end-user computing devices 106 may take the form of any computing device that is capable of running a conversational session of the visual conversation application created by the authoring computing devices 102 via the content authoring tool and/or front-end software for accessing and interacting with the back-end platform 104, which may implement a web-based version of the visual conversation application. In this respect, the end-user computing devices 106 may include hardware components such as one or more processors, data storage, one or more communication interfaces, and input/output (I/O) components, among other possible hardware components. The end-user computing devices 106 may also include software components such as operating system software and front-end software that is capable of interfacing with the back-end platform 104, among various other possible software components. As representative examples, the end-user computing devices 106 could be any of a smartphone, a tablet, a laptop, or a desktop computer, among other possibilities, and it should be understood that different end-user computing devices 106 could take different forms (e.g., different types and/or models of computing devices).

As further depicted in FIG. 1, the authoring computing devices 102 the back-end platform 104, and the end-user computing devices 106 are configured to interact with one another over respective communication paths. Each respective communication path with the back-end platform 104 may generally comprise one or more communication networks and/or communications links, which may take any of various forms. For instance, each respective communication path with the back-end platform 104 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with the back-end platform 104 may be wireless, wired, or some combination thereof, and may carry data according to any of various different communication protocols. Although not shown, the respective communication paths with the back-end platform 104 may also include one or more intermediate systems. For example, it is possible that the back-end platform 104 may communicate with the authoring computing devices 102 and/or the end-user computing devices 106 via one or more intermediary systems, such as a host server (not shown). Further, it is possible that the computing devices might communicate over a communication path that does not include the back-end platform 104 as an intermediary. Many other configurations are also possible.

Although not shown in FIG. 1, the back-end platform 104 may also be configured to receive data from one or more external data sources that may be used to facilitate functions related to the disclosed process. A given external data source—and the data output by such data sources—may take various forms. One possible data source may be a server maintained by a third-party organization that may contain specific information that is not stored or maintained on the back-end platform 104, such as information that is specific to the third-party organization maintaining the server. As one example, where the third-party organization is a medical organization, specific information that is stored on the third-party server may include instructions for how to administer or take a given drug, as well as possibly precautionary information regarding the given drug. As another example, where the third-party organization is a toy manufacturer, specific information that is stored on the third-party server may include marketing information about a given toy. Various other examples also exist.

It should be understood that the network environment 100 is one example of a network environment in which embodiments described herein may be implemented. Numerous other arrangements are possible and contemplated herein. For instance, other network environments may include additional components not pictured and/or more or fewer of the pictured components.

In practice, and in line with the example configuration above, the disclosed content authoring tool may be running on one of the authoring computing devices 102 of a first user who may wish to create a visual conversation application. The visual conversation application created may then be installed and executed on one of the end-user computing devices 106 of a second user who may wish to interact with a digital character in a conversational session of the visual conversation application. Alternatively, the functions carried out by one or both of the authoring computing device 102 or the end-user computing device 106 may be carried out via a web-based application that is facilitated by the back-end platform 104. Further, the operations of the authoring computing device 102, the operations of the back-end platform 104, and/or the operations of the end-user computing device 106 may be performed by a single computing device. Further yet, the operations of the back-end platform 104 may be performed by more than one computing device. For example, some of the operations of the back-end platform 104 may be performed by the authoring computing device 102, while others of the operations of the back-end platform 104 may be performed by the end-user computing device 106.

II. EXAMPLE PLATFORM

Figure 2:
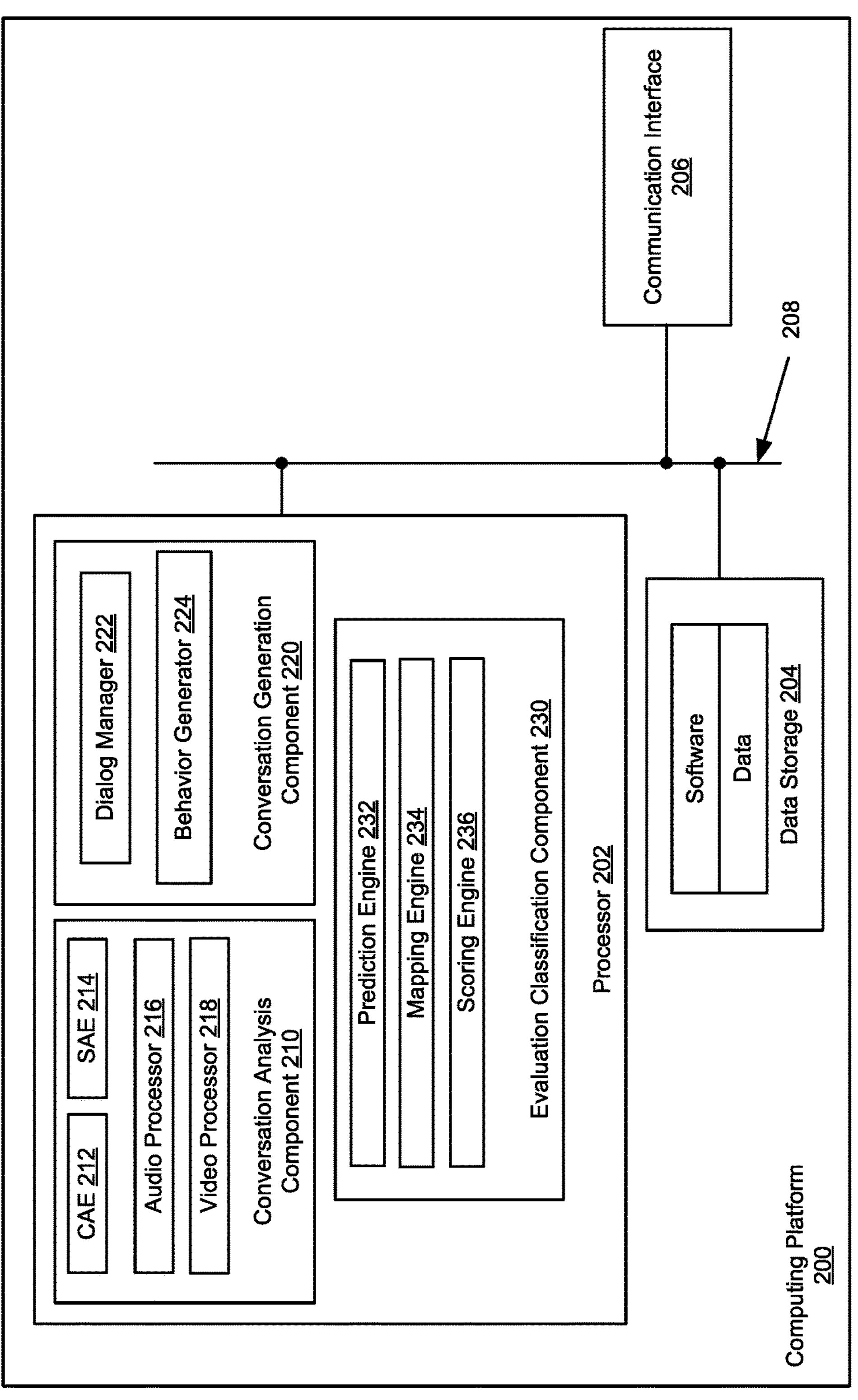
FIG. 2 is a simplified block diagram that illustrates some structural components that may be included in an example computing platform, in accordance with the present disclosure.

FIG. 2 is a simplified block diagram illustrating some structural components that may be included in an example computing platform 200, which could serve as the back-end platform 104 of FIG. 1. In line with the discussion above, the computing platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid network, or some other wired and/or wireless connection mechanism.

The processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that the processor 202 could comprise processing components that are distributed across a plurality of physical computing devices connected via a network, such as a computing cluster of a public, private, or hybrid networks.

In one implementation, as shown in FIG. 2, the processor 202 may comprise a conversation analysis component 210, a conversation generation component 220, and an evaluation classification component 230. Generally speaking, the conversation analysis component 210 may be configured to analyze and interpret inputs received from a computing device (e.g., one of the authoring computing devices 102 or one of the end-user computing devices 106). For instance, the conversation analysis component 210 may be configured to analyze audio and/or video data of a user's (e.g., a patient's) responses to capture a variety of information, including answers to questions, personality traits, knowledge levels, skills, body language, and/or stress levels, among other examples. The conversation analysis component 210 may take various forms.

As one possibility, the conversation analysis component 210 may include a content analysis engine ("CAE") 212, a sentiment analysis engine ("SAE") 214, an audio processor 216, and a video processor 218. The CAE 212 may be configured to analyze processed audio and/or video data to interpret a user's response. In some instances, various natural language processing (NLP) methods may be used to capture a user's spoken response and parse the user's response to identify key words that can be used to interpret and/or score the user's response. Additionally, the CAE 212 may identify media items that are referenced in the user's response, as well as additional sub-media items or other media items that may be relevant to the user's response. The CAE 212 may then identify candidate interactions with such an identified media item or sub-media item that may be performed by a digital character, and may, in some implementations, propose that such candidate interactions be taken in the future. For example, the CAE 212 may propose candidate interactions based on user responses that are similar to the user responses that the CAE 212 used to identify the candidate interactions.

The SAE 214 may be configured to analyze processed audio and/or video data to capture additional information about a user, beyond the literal meaning of responses provided by the user, such as the user's sentiment. For example, in some implementations, a user's voice fluctuations, tone, pauses, use of filler words, and/or use of corrective statements can be used to identify levels of stress or discomfort. In some implementations, the SAE 214 may be configured to analyze video data (or features identified from the video data) to determine various characteristics or observations about a user, examples of which may include a user's comfort level, personality trait, mood, ability to make eye contact, stress level, emotional state, and/or expressiveness, among other examples.

In some instances, analyzed sentiments can be used in real-time to affect the behavior of a digital character in a variety of ways. For instance, based on an analyzed sentiment, a digital character may become more or less chatty, more or less friendly, and/or more or less expressive. The changes in the behavior of a digital character can then be used to further analyze a user's response to the changing behavior.

The audio processor 216 may be configured to process audio data from a conversational session of the visual conversation application between a user and a digital character. For instance, the audio processor 216 may be configured to process audio data corresponding to a user's utterance during a conversational session of the visual conversation application. In some implementations, the audio processor 216 may be configured to analyze the ambient background noise against a user's utterance in order to isolate the background noise and parse the beginning of the user's utterance as well as the end of the user's utterance. In other implementations, the audio processor 216 may be configured to use various continuous speech recognition techniques known in the art to parse the beginning and the end of a user's utterance.

Further, in some implementations, the audio processor 216 may employ various methods to convert the audio data into an interpretable form, such as Automatic Speech Recognition (ASR). In other implementations, the audio processor 216 may use a speech to text (STT) process to produce textual outputs that can be further processed to capture meaning, emotions, sentiment, and/or stress levels. In some instances, the audio processor 216 may apply filters to the audio data (and/or to textual outputs generated from the audio data) to edit unnecessary elements, such as pauses, filler words, and/or corrected statements. Further, in some implementations, these elements can be used as an additional metric to capture metadata related to a user's conversational skills to support the capture of a variety of information including (but not limited to) answers to questions, personality traits, knowledge levels, skills, body language, and/or stress levels.

The video processor 218 may be configured to process video data from a conversational session between a user and a digital character. In some implementations, the video processor 218 may be used to analyze video for visual cues that may not be readily apparent in the audio data captured during a conversational session, such as a user's body language. In some instances, the video processor 218 may employ various machine learning methods, such as convolutional neural networks, recurrent neural networks, and/or capsule networks, to analyze video segments and/or captured images to identify features that can be used to analyze a user's body language.

One of ordinary skill in the art will appreciate that the conversation analysis component 210 may take various other forms and may include various other elements as well.

In accordance with the present disclosure, the conversation generation component 220 may be configured to generate a script for a digital character. The script can be generated based on a variety of different factors, such as information about a user involved in a conversational session with the digital character. In several implementations, the script may be generated dynamically, adjusting with each response received from a user during a conversational session, based on the content, sentiment, and/or other factors identified from the user's response. In certain implementations, a first user (e.g., a doctor) may manually author a script that is used during a conversational session between a digital character and a second user (e.g., a patient), which in some instances may involve fine-tuning existing content to convey information in a certain way, including (but not limited to) a positive or negative disposition of the digital character, emphasis of a certain word or phrase, etc. In this respect, the conversation generation component 220 may take various forms.

As one example, the conversation generation component 220 may include a dialog manager 222 and a behavior generator 224. The dialog manager 222 may be configured to generate dialog that is to be presented to a user. For instance, the dialog manager 222 may be configured to generate a textual script that can be provided in audio or text form at the authoring computing device 102 and/or the end-user computing device 106. In some implementations, the script may be selected from a set of predefined scripts. In other implementations, the script may be generated dynamically using machine learning methods including, but not limited to, generative adversarial networks (GANs), recurrent neural networks (RNNs), capsule networks, and/or restricted Boltzmann machines (RBMs).

The behavior generator 224 may be configured to generate behaviors for a digital character that converses with a user during a conversational session of the visual conversation application. For instance, the behavior generator 224 may be configured to generate randomized behaviors and gestures to create a sense of realism during a conversational session of the visual conversation application with a user. In some implementations, such behaviors may be generated based on machine learning methods, such as generative adversarial networks (GANs) and/or Restricted Boltzmann Machines (RBMs). In other implementations, behaviors may be generated in a standardized format for describing model animations, such as Behavioral Markup Language (BML).

In some embodiments, the behavior generator 224 may receive information about a user as input to the behavior generation 224. In certain embodiments, behaviors for a digital character may be generated to mimic the body language of a user to put the user at ease or to develop a sense of rapport. For instance, the behavior generator 224 may provide movements and postures to indicate that the digital character is listening, waiting for further clarification, processing user input, or (temporarily) disengaged from the conversation with the user. In some embodiments, the behavior generator 224 can identify facial expressions to indicate emotions, such as confusion, agreement, anger, happiness, and disappointment. In a variety of embodiments, the behavior generator 224 may be configured to generate customized behaviors for a digital character, which may be based on a variety of factors, such as character, personality archetype, and/or culture. In some instances, the behavior generator 224 may be configured to generate customized behaviors for a digital character based on behavior of a first user during the authoring phase that the first user may act in (described in more detail below), which may be interpreted, for example, by the audio processor 216 and/or the video processor 218.

Further, in some implementations wherein the first user manually authors a script that is used during a conversational session of the visual conversation application between a digital character and a second user (e.g., a patient), the conversation generation component 220 may also perform various additional functions via the dialog manager 222, the behavior generator 224, or other subcomponents of the conversation generation component 220. For example, the conversation generation component 220 may perform additional functions to customize a digital character to engage with media items presented during a conversational session of the visual conversation application in accordance with a given media interaction selected by the first user during a content authoring phase, as discussed in greater detail herein. Various other examples also exist.

One of ordinary skill in the art will appreciate that the conversation generation component 220 may take various other forms and may include various other elements as well.

The evaluation classification component 230 may take various forms as well. In general, the evaluation classification component 230 may be configured to evaluate a conversational session of the visual conversation application between a user and a digital character (or the user involved in the conversational session of the visual conversation application). For instance, the evaluation classification component 230 may be configured to evaluate a user's response time to a question, a user's stress level, knowledge, and/or competency. The evaluation may be performed during a conversational session of the visual conversation application between a user and a digital character and/or after a conversational session of the visual conversation application has ended.

In some implementations, the evaluations of a conversational session of the visual conversation application between a user and a digital character (or the user involved in the conversational session of the visual conversation application) can be used to train a model to adjust future conversational sessions of the visual conversation application. Adjustments for the future conversational sessions of the visual conversation application may include changing the digital character's behaviors, reactions, gestures, and questions that are generated in response to interactions with a user. In implementations where a conversational session of the visual conversation application involves a user and multiple digital characters, each digital character may exhibit certain behaviors as described herein which may change over time.

As shown in FIG. 2, the evaluation classification component 230 may include a prediction engine 232, a mapping engine 234, and a scoring engine 236. The prediction engine 232 may be configured to make predictions about a user involved in a conversational session with a digital character, such as the user's stress level, knowledge, and/or competency.

The scoring engine 236 may be configured to generate scores for a user involved in a conversational session with a digital character that can be used to summarize various aspects of the user, such as the user's personality traits, technical skills, knowledge, and/or soft skills. In some implementations, scoring engines can also include various statistics related to a conversational session, including a user's response time, length of sentences, and/or vocabulary diversity.

Although the scoring engine 236 is described as part of the computing platform 200, in some implementations, the scoring engine 236 may be provided by a third party system that analyzes various characteristics provided by the computing platform 200 to generate a score. For example, in some cases, a third party system may be used to generate personality scores and/or technical competence scores based on text of a user's answers to specific questions during a conversational session with a digital character.

The mapping engine 234 may be configured to identify scores for individual characteristics of a user and map them to criteria to be reported for a conversational session of the visual conversation application. For example, a score for friendliness of a user, which may be generated by the scoring engine 236 based on various factors (e.g., smiling, voice tone, language, and eye contact, etc.), may be mapped to a criteria to report the level of friendliness of the user involved in a conversational session with a digital character.

One of ordinary skill in the art will appreciate that the evaluation classification component 230 may take various other forms and may include various other elements as well. Further, one of ordinary skill in the art will appreciate that the processor 202 may comprise other processor components as well.

As further shown in FIG. 2, the computing platform 200 may also include data storage 204 that comprise one or more non-transitory computer-readable storage mediums, examples of which may include volatile storage mediums such as random-access memory (RAM), registers, cache, etc. and non-volatile storage mediums such as read-only memory (ROM), a hard-disk drive, a solid-state drive, flash memory, an optical-storage device, etc. In line with the discussion above, it should also be understood that the data storage 204 may comprise computer-readable storage mediums that are distributed across a plurality of physical computing devices connected via a network, such as a storage cluster of a public, private, or hybrid cloud-based storage systems.

As shown, the data storage 204 may be provisioned with software components that enable the computing platform 200 to carry out the platform-side functions disclosed herein. These software components may generally take the form of program instructions that are executable by the processor 202 to carry out the disclosed functions, which may be arranged together into software applications, virtual machines, software development kits, toolsets, or the like. Further, the data storage 204 may be arranged to store data in one or more databases, file systems, or the like. The data storage 204 may take other forms and/or store data in other manners as well.

The communication interface 206 may be configured to facilitate wireless and/or wired communication with external data sources and/or computing devices, such as the authoring computing device 102 and/or the end-user computing device 106 in FIG. 1. Additionally, in an implementation where the computing platform 200 comprises a plurality of physical computing devices connected via a network, the communication interface 206 may be configured to facilitate wireless and/or wired communication between these physical computing devices (e.g., between computing and storage clusters in a cloud network). As such, the communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. The communication interface 206 may also include multiple communication interfaces of different types. Other configurations are possible as well.

Although not shown, the computing platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the computing platform 200.

It should be understood that the computing platform 200 is one example of a computing platform that may be used with the embodiments described herein. Numerous other arrangements are possible and contemplated herein. For instance, other computing platforms may include additional components not pictured and/or more or fewer of the pictured components.

III. EXAMPLE COMPUTING DEVICE

Figure 3:
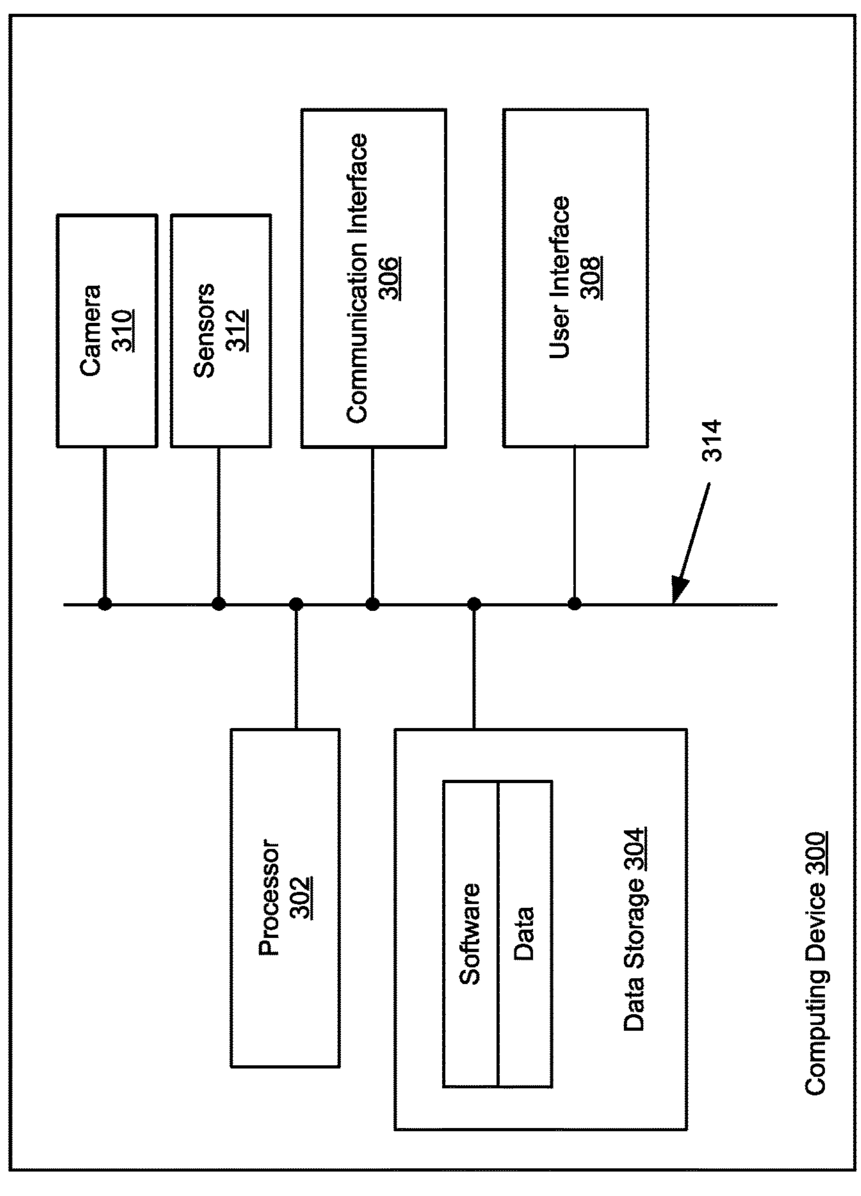
FIG. 3 is a simplified block diagram that illustrates some structural components that may be included in an example computing device, in accordance with the present disclosure.

FIG. 3 is a simplified block diagram illustrating some structural components that may be included in an example computing device 300, which could serve as one of the authoring computing device 102 and/or one of the end-user computing device 106 of FIG. 1.

The computing device 300 may generally comprise a processor 302, data storage 304, a communication interface 306, a user interface 308, one or more cameras 310, and sensors 312, all of which may be communicatively linked by a communication link 314 that may take the form of a system bus or some other connection mechanism. In line with the discussion above, the computing device 300 may take various forms, examples of which may include a wearable device, a laptop, a netbook, a tablet, and/or a smartphone, among other possibilities.

The processor 302 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed.

In turn, the data storage 304 may comprise one or more non-transitory computer-readable storage mediums, examples of which may include volatile storage mediums such as random-access memory (RAM), registers, cache, etc. and non-volatile storage mediums such as read-only memory (ROM), a hard-disk drive, a solid-state drive, flash memory, an optical-storage device, etc.

As shown in FIG. 3, the data storage 304 may be provisioned with software components that enable the computing device 300 to carry out authoring and/or rendering functions disclosed herein. In some embodiments, the data storage 304 may be provisioned with software components that enable the computing device 300 to carry out functions to present a view of the real-world environment that has overlaid virtual content. In this respect, the computing device 300 may be a computing device with augmented reality ("AR") capabilities that can be used to present an enhanced view that superimposes virtual content on a view of the real-world environment.

Generally speaking, the software components described above may generally take the form of program instructions that are executable by the processor 302 to carry out the disclosed functions, which may be arranged together into software applications, virtual machines, software development kits, toolsets, or the like. Further, the data storage 304 may be arranged to store data in one or more databases, file systems, or the like. The data storage 304 may take other forms and/or store data in other manners as well.

The communication interface 306 may be configured to facilitate wireless and/or wired communication with another network-enabled system or device, such as the back-end platform 104, the authoring computing device 102, or the end-user computing device 106. The communication interface 306 may take any suitable form, examples of which may include an Ethernet interface, a serial bus interface (e.g., Firewire, USB 3.0, etc.), a chipset and antenna adapted to facilitate wireless communication, and/or any other interface that provides for wireless and/or wired communication. The communication interface 306 may also include multiple communication interfaces of different types. Other configurations are possible as well.

The user interface 308 may be configured to facilitate user interaction with the computing device 300 and may also be configured to facilitate causing the computing device 300 to perform an operation in response to user interaction. Examples of the user interface 308 include a touch-sensitive interface, mechanical interface (e.g., levers, buttons, wheels, dials, keyboards, etc.), and other input interfaces (e.g., microphones), among other examples. In some cases, the user interface 308 may include or provide connectivity to output components, such as display screens, speakers, headphone jacks, and the like.

The camera(s) 310 may be configured to capture a real-world environment in the form of image data and may take various forms. As one example, the camera 310 may be forward-facing to capture at least a portion of the real-world environment perceived by a user. One of ordinary skill in the art will appreciate that the camera 310 may take various other forms as well.

The sensors 312 may be generally configured to capture various data. As one example, the sensors 312 may comprise a microphone capable of detecting sound signals and converting them into electrical signals that can be captured via the computing device 300. As another examples, the sensors 312 may comprise sensors (e.g., accelerometer, gyroscope, and/or GPS, etc.) capable of capturing a position and/or orientation of the computing device 300, and such sensor data may be used to determine the position and/or orientation of the computing device 300.

Although not shown, the computing device 300 may additionally include one or more interfaces that provide connectivity with external user-interface equipment (sometimes referred to as "peripherals"), such as a keyboard, a mouse or trackpad, a display screen, a touch-sensitive interface, a stylus, speakers, etc., which may allow for direct user interaction with AR-enabled the computing device 300.

It should be understood that the computing device 300 is one example of a computing device that may be used with the embodiments described herein. Numerous other arrangements are possible and contemplated herein. For instance, other computing devices may include additional components not pictured and/or more or fewer of the pictured components.

IV. EXAMPLE OPERATIONS

As described above, the present disclosure is generally directed to software technology for facilitating a conversational session of a visual conversation application between a user (e.g., a client, a patient, etc.) and a digital character, wherein the digital character is configured to also interact with other media items presented along with the digital character in the conversational session.

At a high level, the disclosed software technology may include a content authoring tool for creating a visual conversation application with a digital character configured to interact with additional media items presented along with the digital character in a conversational session of the visual conversation application. In one implementation, a first user (e.g., a professional such as a doctor, lawyer, banker, etc.) may access the content authoring tool via one of the authoring computing devices 102 to create a visual conversation application, which may involve (i) authoring behavioral and conversational content for a digital character that can ask questions as well as respond to questions from a second user (e.g., a client, a patient, etc.) as well as (ii) authoring behavioral and conversational content for the digital character to engage with additional media items presented along with the digital character in a conversational session of the visual conversation application. The visual conversation application created by the first user may be later accessed by the second user via one of the end-user computing devices 106 to interact with the digital character in a conversational session of the visual conversation application.

In practice, the content authoring tool may be provided to a party (e.g., an organization) in the form of a software as a service ("SaaS") application that includes various other tools (e.g., administrative tools, etc.). In a SaaS context, the content authoring tool may include (i) a front-end software component running on one or more of the authoring computing devices 102 that may be operable by the first user and (ii) a back-end software component running on the back-end platform 104 that is accessible to one or more of the authoring computing devices 102 via a communication network such as the Internet. Further, in practice, the back-end platform 104 may be capable of serving multiple different parties that have signed up for access to the content authoring tool, where each such party (e.g., each organization) has its own respective account for the content authoring tool and respective users (e.g., professionals) who may have access to the content authoring tool under the respective account. Further yet, in practice, the visual conversation application created by the first user of the authoring computing device 102 via the content authoring tool may be later accessed by a user of the end-user computing device 106 who has permission to access the visual conversation application. In this situation, the visual conversation application may include (i) a front-end software component running on the end-user computing device 106 and (ii) a back-end software component running on the back-end platform 104 that is accessible to the end-user computing device 106 via a communication network such as the Internet.

The visual conversation application created by a user via the authoring computing device 102 using the disclosed content authoring tool may be created by various kinds of users and may take various forms accordingly. As one example, the visual conversation application may be created by a medical professional (e.g., a doctor) and may comprise a medical conversation application that generally enables a patient to interact with a digital character during a conversational session regarding a medical matter (e.g., information about a drug, medical procedure, medical condition, etc.). As another example, the visual conversation application may be created by a business professional and may comprise an interview conversation application that generally enables an interviewee to interact with a digital character that is configured to interview the interviewee during a conversational session. As yet another example, the visual conversation application may be created by a manufacturer of a given product (e.g., a toy, an automobile, etc.) and may comprise a product conversation application that generally enables a customer to interact with a digital character during a conversational session regarding a product-related matter (e.g., information about the given product, product support, etc.). As still another example, the visual conversation application may be created by an employer and may comprise a training conversation application that generally enables a trainee for a given job to interact with a digital character that is configured to teach the trainee during a conversational session. As still another example, the visual conversation application may be created by a software experience provider and may comprise a companion conversation application that generally enables an individual to interact with a digital character that is configured to provide companionship (e.g., by engaging the individual in game-based activities for recreation, engaging the individual in conversations about their day, etc.) during a conversational session. The visual conversation application may be created by various other users and may take various other forms accordingly.

A digital character that may be created and employed to interact with a user of the end-user computing device 106 (e.g., a patient, a client, a trainee, etc.) during a conversational session of the visual conversation application may take various other forms as well. As discussed, U.S. Pat. No. 11,204,743 describes examples of creating a digital character in greater detail.

A. Example Authoring Phase

As discussed above, a first user may utilize the disclosed content authoring tool via the authoring computing device 102 to create a visual conversation application, wherein second users of the visual conversation application may engage in a conversation with a digital character that is presented in a conversational session of the visual conversation application via respective end-user computing devices. In addition, further enhancements to the digital character may be made via the content authoring tool, such that the first user of the content authoring tool may configure the digital character to interact with other media items that may be present in the conversational session of the visual conversation application.

Figure 4:
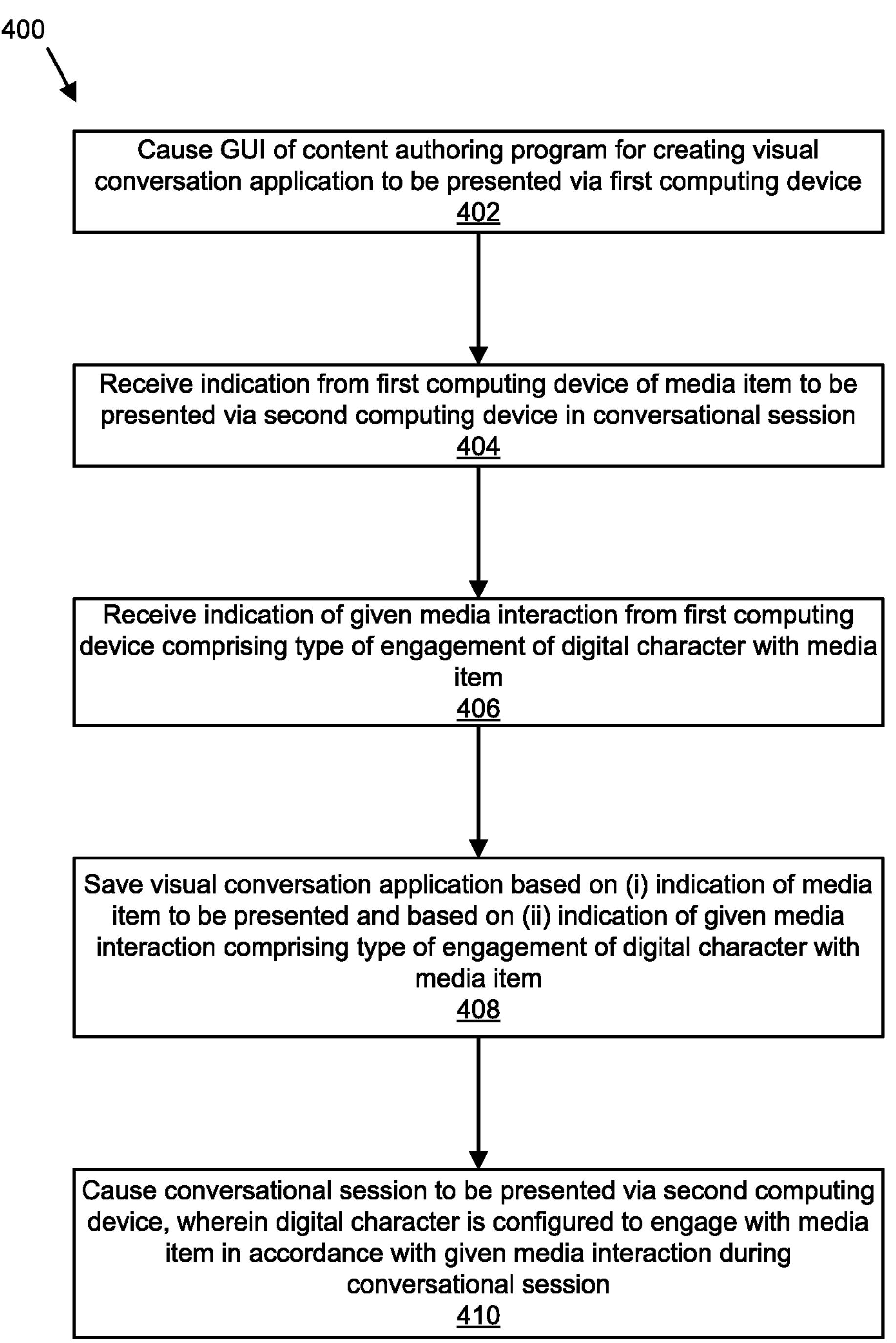
FIG. 4 is a flowchart that shows example operations that may be carried out in accordance with the present disclosure.

FIG. 4 is a flowchart 400 that illustrates various operations that may be carried out by the back-end platform 104 to enable the first user of the content authoring tool to configure a digital character to interact with other media items that may be present in a conversational session of a visual conversation application.

According to an example implementation, an authoring phase may begin with the first user (e.g., a professional, such as a doctor, lawyer, etc.) accessing the disclosed content authoring tool via the authoring computing device 102 in order to create a visual conversation application. In practice, the first user may request access to the content authoring tool by, for example, launching a native application on the authoring computing device 102 and logging into the first user's account or directing a web browser on the authoring computing device 102 associated with a uniform resource locator (URL) for the content authoring tool and logging into the first user's account, either of which may cause the authoring computing device 102 to send a request to the back-end platform 104 to access the content authoring tool.

At block 402, in response to receiving a request from the authoring computing device 102 to access the content authoring tool, the back-end platform 104 may cause a graphical user interface (GUI) of the content authoring tool for creating a visual conversation application to be presented via the authoring computing device 102. The GUI may include, among various other things, (i) a media item that is to be presented, as well as (ii) one or more selectable media interactions for a digital character that is configured to interact with the second user of the end-user computing device 106 in a conversational session of the visual conversation application.

Figure 5:
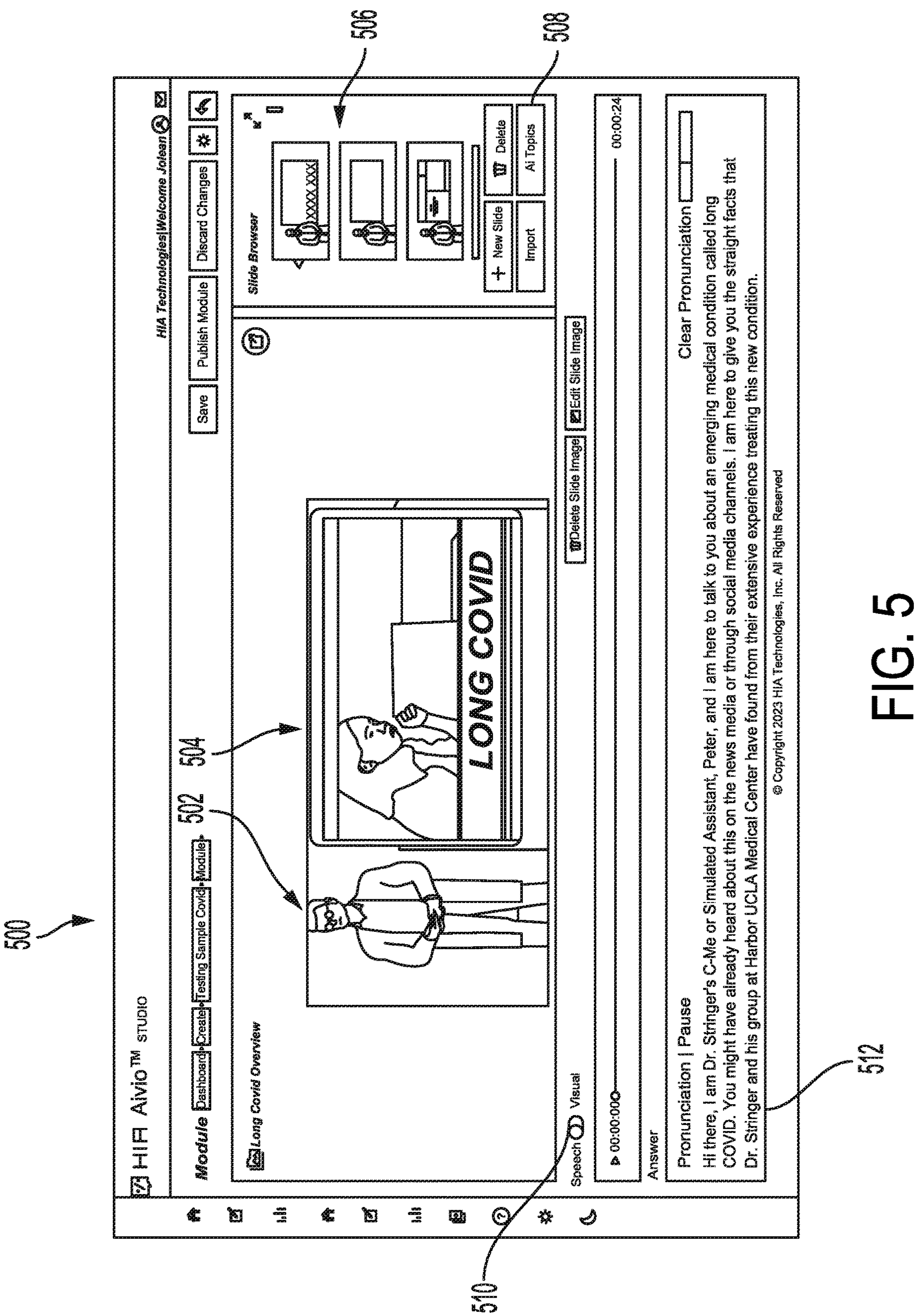
FIG. 5 is an example view of a GUI of a content authoring tool that may be presented via an authoring computing device, in accordance with the present disclosure.

FIG. 5 is an example view 500 of a GUI of the content authoring tool that may be presented via the authoring computing device 102, in accordance with the present disclosure. As described above, the content authoring tool may be utilized by the first user of the authoring computing device 102 to create a visual conversation application, which may be accessible to a second user of the end-user computing device 106 so that the second user may interact with a digital character in a conversational session of the visual conversation application. Accordingly, the example view 500 may include various elements that function to (i) show a preview of how the visual conversation application will appear when presented via the end-user computing device 106, and (ii) enable the first user of the authoring computing device 102 to configure various portions of the visual conversation application. In this regard, the first user may configure various portions of the visual conversation application to operate in certain ways when presented via the end-user computing device 106 in a given conversational session. As some examples, the first user may configure a digital character of the visual conversation application, such as the digital character 502 shown in FIG. 5, to (i) interact with the second user of the end-user computing device 106 in certain ways during the conversational session, and (ii) engage with a media item present during the conversational session in certain ways.

In addition to the digital character 502, the example view 500 may also include various selectable elements pertaining to media items that may be presented via the authoring computing device 102 along with the digital character 502 in a given conversational session of the visual conversation application.

One selectable element pertaining to media items shown in the example view 500 is a media item 504. As shown, the media item 504 is a presentation slide for a "LONG COVID" presentation slide deck. For example, the media item 504 may be an introductory presentation slide for the "LONG COVID" presentation slide deck, and the presentation slide deck may include various other presentation slides. As discussed, the media item 504 may take any of various forms, of which the presentation slide for the "LONG COVID" presentation slide deck is intended only as a single example.

Further, in some implementations, the media item 504 may be only one of various media items that may be presented via the authoring computing device 102 along with the digital character 502 in a given conversational session of the visual conversation application. Additionally or alternatively, the media item 504 may be a sub-media item of a different media item that may be presented via the authoring computing device 102. Various other possibilities may also exist.

Another selectable element pertaining to media items shown in the example 500 is a set of media items 506. As one possibility, the set of media items 506 may be the "LONG COVID" presentation slide deck, and may comprise various presentation slides, including the media item 504. In practice, the set of media items 506 may be searchable by the first user of the authoring computing device 102, for example, by scrolling through the various presentation slides of the set of media items 506, to enable the first user to identify and select the media item 504 from among the various presentation slides of the set of media items 506 for presenting with the digital character 502 in a conversational session of the visual conversation application. As may be appreciated, the set of media items 506 may take any of various forms, of which the presentation slide deck is intended only as a single example.

Yet another selectable element pertaining to media items shown in the example view 500 is an artificial intelligence (AI) topics icon 508. In practice, the AI topics icon 508 may be selectable by the first user of the authoring computing device 102 to present a number of AI topics that may be relevant to the first user's profession. The AI topics may be searchable to enable the first user to identify and select, as one possibility, the set of media items 506 from among various other AI topics presented upon selection of the AI topics icon 508. The selected set of media items 506 may then be presented via the content authoring tool, as shown in FIG. 5. The AI topics presented upon selection of the AI topics icon 508 may include various other topics that may be relevant to the first user's profession. As may be appreciated, the AI topics icon 508 may take any of various forms and may present any number of AI topics for user selection.

In addition to the digital character 502 and the various selectable elements pertaining to media items that may be presented along with the digital character 502 (e.g., the media item 504, the set of media items 506, and the AI topics icon 508, among other possibilities), the example view 500 may also include various selectable elements pertaining to media interactions for the digital character 502.

One selectable element pertaining to media interactions for the digital character 502 shown in the example view 500 is a toggle 510. The toggle 510 may function to switch between presenting (i) views for speech-related selectable elements pertaining to media interactions for the digital character 502 and presenting (ii) views for visual-related selectable elements pertaining to media interactions for the digital character 502 when selected by the first user of the authoring computing device 102. For instance, the example view 500 may be one view of the content authoring tool that may be presented via the authoring computing device 102 when the toggle 510 is in the "Speech" position, whereas other views of the content authoring tool may be presented via the authoring computing device 102 when the toggle 510 is in the "Visual" position. Several possible views for both toggle positions (e.g., the "Speech" position and the "Visual" position) are discussed in greater detail herein.

Another selectable element pertaining to media interactions for the digital character 502 shown in the example view 500 is a text box 512. The text box 512 may be an editable field that the first user of the authoring computing device 102 may utilize to provide content to be spoken by the digital character 502 at a certain time in a given conversational session of the visual conversation application.

In practice, the first user of the authoring computing device 102 may provide the content that is to be spoken by the digital character 502 in various ways. As one possibility, the first user may type or dictate the content that is to be spoken by the digital character 502 to fill in the text box 512. As another possibility, the first user may select the content that is to be spoken by the digital character 502 from a content library accessible to the content authoring tool that may store various content that may be spoken by the digital character 502. As yet another possibility, the content that is to be spoken by the digital character 502 may be imported from another source. As one example, in implementations where the media item 504 is a visual representation of a presentation slide, the content that is to be spoken by the digital character 502 may be imported directly from the media item 504, such that the digital character 502 may be configured to speak content that is presented via the media item 504. As another example, the imported content that is to be spoken by the digital character 502 may be imported from a "notes" or similar portion of a visual representation of a presentation slide. As yet another possibility, the content that is to be spoken by the digital character 502 may be generated using an AI module that generates such content based on (i) content of a visual representation of a presentation slide and/or (ii) other information provided to the AI module. Various other possibilities exist.

The first user of the authoring computing device 102 may define at what time or under what circumstances certain content of the text box 512 is to be spoken by the digital character 502. For instance, the first user may configure the digital character 502 to speak certain content written in the text box 512 when asked a certain question or a question about a certain topic by the second user of the end-user computing device 106 during a conversational session of the visual conversation application. In practice, the first user may define various other times or circumstances under which certain content of the text box 512 is to be spoken by the digital character 502.

As another possibility, the first user of the authoring computing device 102 may configure the media item 504 to speak certain content of the text box 512 in implementations where the media item 504 takes the form of another digital character. As may be appreciated, in implementations where the media item 504 takes the form of another digital character, the first user may also have the ability to create content to be spoken by the other digital character, which may be directed towards the digital character 502 or the second user of the end-user computing device 106, among various other possibilities. Further, in implementations where the media item 504 takes the form of another digital character, the content authoring tool may provide the first user with the ability to configure the functionality of the additional digital character in the same manner described with respect to the digital character 502.

The example view 500 of FIG. 5 shows only one possible view of the GUI of the content authoring tool that may be presented via the authoring computing device 102 that includes selectable elements pertaining to media interactions for the digital character 502. In practice, various other views of the GUI of the content authoring tool may be presented via the authoring computing device 102 that include selectable elements pertaining to media interactions for a digital character, some of which are described with regards to FIGS. 6-9.

Figure 6:
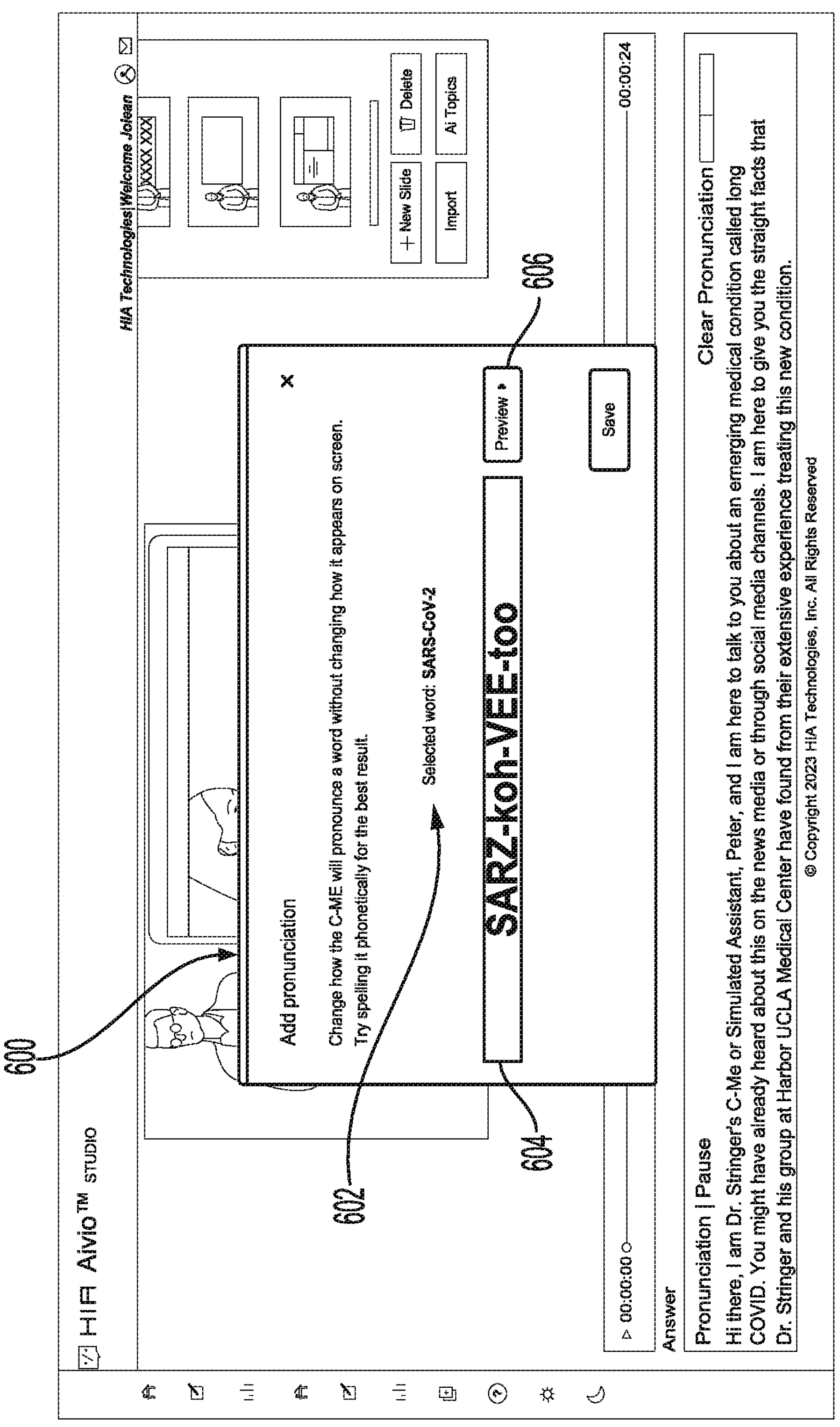
FIG. 6 is an example view of a GUI of the content authoring tool that may be presented via the authoring computing device, in accordance with the present disclosure.

FIG. 6 shows an example view 600 of the GUI of the content authoring tool that may be presented via the authoring computing device 102, in accordance with the present disclosure. The example view 600 may include speech-related selectable elements pertaining to media interactions for a digital character, such as the digital character 502. In this regard, how the digital character pronounces certain content may also be considered a configurable media interaction, in line with the discussion above.

The example view 600 may be presented via the authoring computing device 102 at various times. As one possibility, the example view 600 may be presented via the authoring computing device 102 when, while the toggle 510 is in the "Speech" position, the first user of the authoring computing device 102 selects a given selectable element (e.g., an "edit pronunciation" selectable element or the like) of the GUI to edit the digital character's pronunciation of certain content from the text box 512.

The example view 600 may include speech text 602 indicating the content for which the digital character's pronunciation is to be edited. As shown, the speech text 602 comprises the word "SARS-CoV-2," although in practice, the speech text 602 may be any word, phrase, etc. for which the first user of the authoring computing device 102 wishes to edit the digital character's pronunciation.

The example view 600 may also include a pronunciation guide 604 that may be filled in by the first user of the authoring computing device 102 to define a pronunciation for the speech text 602 that the digital character 502 should use when speaking the speech text 602. As shown, the pronunciation guide 604 reads "SARZ-koh-VEE-too" which provides a phonetic pronunciation of SARS-CoV-2 and may enable the digital character 502 to pronounce SARS-CoV-2 more accurately. In another example, the pronunciation guide 604 may include an option to select an origin of the word (e.g., Latin, Spanish, French, etc.) that could be used to provide an initial pronunciation that can be further modified by the user if desired. Other examples are also possible.

In practice, the pronunciation guide 604 may be filled in by the first user of the authoring computing device 102 in various ways. As one possibility, the first user may fill in the pronunciation guide 604 via typing into a text field or the like of the pronunciation guide 604. As another possibility, the pronunciation guide 604 may comprise a dropdown menu showing various pronunciations of the speech text 602, which may, in some implementations, be based on location information indicating (i) a location of the first user, (ii) a location where the visual conversation application is expected to be utilized, and/or (iii) a location of the second user of the end-user computing device 106. Further, in some implementations, the pronunciation guide 604 may show alternate words or phrases to supplement or replace certain content of the speech text 602. Such alternate words or phrases may be based on the location information described.

Further, in practice, the content authoring tool may be configured to receive location information, which may indicate (i) a location of the authoring computing device 102, (ii) a location of the end-user computing device 106, and/or (iii) an expected location where the content authoring tool may be utilized, among various other things.

Further yet, in practice, the location information may take various forms, and may be received in various ways.

Location information indicating a location of the authoring computing device 102 may be received from the authoring computing device 102 and may take the form of (i) a GPS location of the authoring computing device 102, (ii) an IP address of the authoring computing device 102, which the content authoring tool may utilize to determine location information of the authoring computing device 102, and/or (iii) information indicating an input by the first user (e.g., via an input option of the GUI of the content authoring tool presented via the authoring computing device 102) that identifies a location of the authoring computing device 102, among various other possibilities.

Location information indicating a location of the end-user computing device 106 may be received from the end-user computing device 106 and may take the form of (i) a GPS location of the end-user computing device 106, (ii) an IP address of the end-user computing device 106, which the content authoring tool may utilize to determine location information of the authoring computing device 102, and/or (iii) information indicating an input by the second user (e.g., via an input option of the GUI of the visual conversation application presented via the end-user computing device 106) that identifies a location of the end-user computing device 106, among various other possibilities.

Location information indicating an expected location where the visual conversation application will be utilized may be received by the authoring computing device 102 or other computing device, and may take the form of information indicating an input by the first user or other source that identifies an expected location where the visual conversation application will be utilized.

In practice, the location information may take various other possible forms, and may be received in various other ways as well.

The example view 600 may also include a preview icon 606 that may, when selected by the first user of the authoring computing device 102, output a preview of how the selected text 602 will be pronounced by the digital character 502 according to the pronunciation guide 604. In practice, the preview may be in the voice of the digital character 502, and may include the speech text 602, as well as optionally text surrounding the speech text 602 in the text box 512.

Although the example view 600 shows speech-related selectable elements pertaining to the ways that the digital character 502 pronounces certain words or phrases, in practice, the example view 600 may include other speech-related selectable elements pertaining to media interactions of the digital character 502. For example, the example view 600 may include selectable elements that may edit the manner in which the digital character 502 pauses at certain points while speaking, such as between sentences, after commas, or after asking a question, among various other possibilities. In such an example, the example view may be presented via the authoring computing device 102 when, while the toggle 510 is in the "Speech" position, the first user of the authoring computing device 102 selects a given selectable element (e.g., an "edit pauses" selectable element or the like) of the GUI of the content authoring tool to edit the manner in which the digital character 502 pauses at various times while speaking certain content, such as content from the text box 512.

As may be appreciated, the example view 600 may include various other speech-related selectable elements pertaining to media interaction of the digital character 502 as well.

Figure 7:
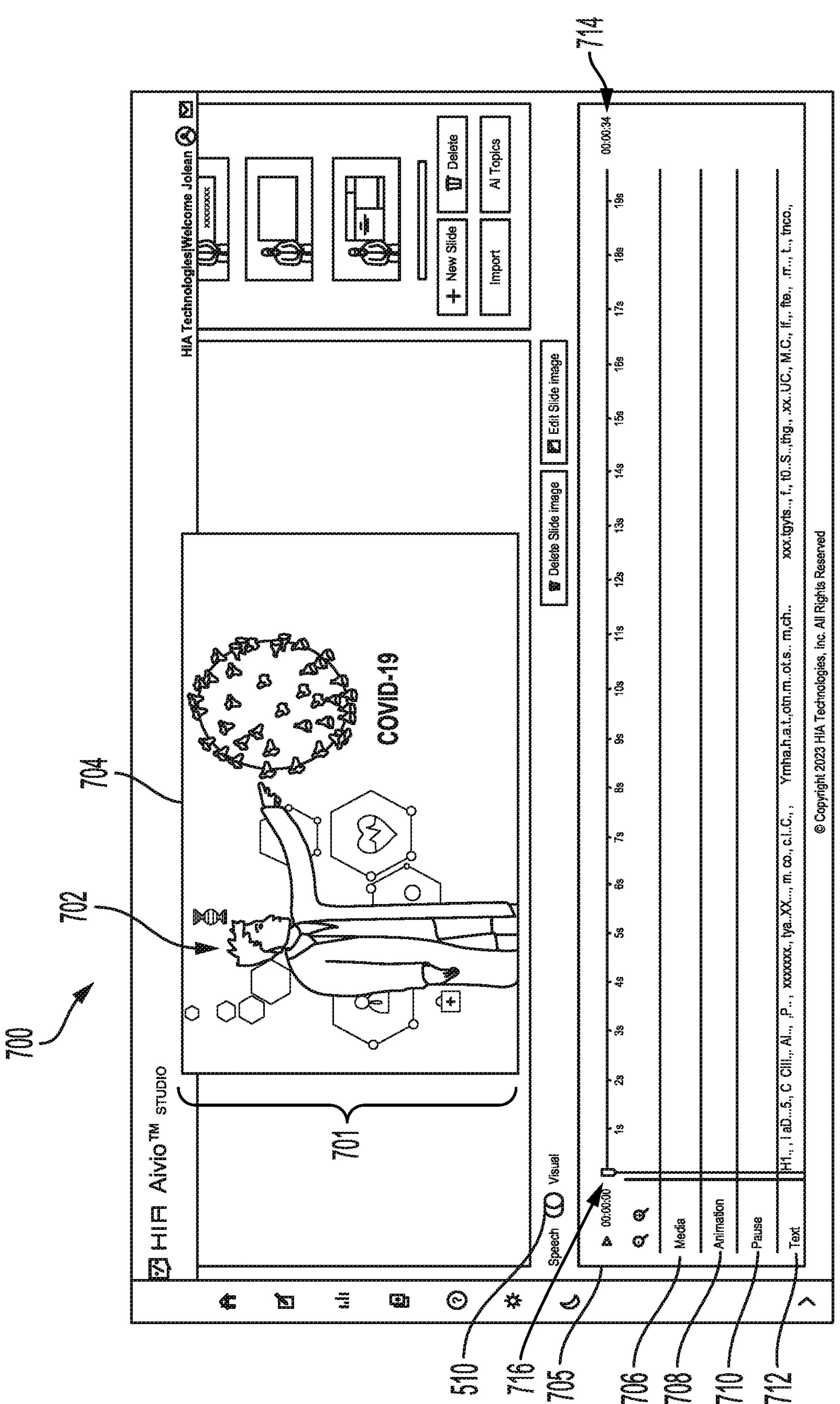
FIG. 7 is an example view of the GUI of the content authoring tool that may be presented via the authoring computing device, in accordance with the present disclosure.

FIG. 7 shows another example view 700 of the GUI of the content authoring tool that may be presented via the authoring computing device 102, in accordance with the present disclosure. More specifically, the example view 700 may include a preview portion 701 that shows a digital character 702, which may be the digital character 502 or a different digital character. The preview portion 701 also shows a media item 704, which may be the media item 504 or a different media item. Additionally, the example view 700 includes the toggle 510 as described in FIG. 5, as well as a timeline view portion 705 that highlights various kinds of media interactions for the digital character 702 over a given period of time, such as a period of time that the digital character 702 will speak certain content related to the media item 704.

The preview portion 701 may function to visually show how the digital character 702 will behave over the course of a certain period of time, such as the period of time that the digital character 702 will speak certain content. For example, the digital character 702 may be configured to, while speaking the certain content, engage with the media item 704 in certain ways. Accordingly, the preview portion 701 may give the first user of the authoring computing device 102 a visual (and perhaps audio) preview of how the digital character 702 will behave during a conversational session of the visual conversation application while speaking the certain content. For example, the preview portion 701 may give the first user a preview of what digital motions the digital character 702 may be animated to perform, what pronunciations the digital character 702 may use while speaking the certain content, what pauses the digital character 702 may take while speaking the certain content, among various other examples.

As another possibility, the preview portion 701 may function to visually (and perhaps audibly) show how the digital character has behaved during a past conversational session of the visual conversation application (e.g., a conversational session with a particular user). For example, the preview portion 701 may show what digital motions the digital character 702 performed during the conversational session, what pronunciations the digital character 703 used to speak certain content, when the digital character 702 inserted pauses while speaking the certain content, among other examples. In practice, some or all of these digital motions, pronunciations, and/or pauses of the digital character 702 may have been driven by user interaction with the digital character 702 during the conversational session of the visual conversation application.

In either case, the content authoring tool may enable the first user of the authoring computing device 102 to determine the certain period of time shown in the preview portion 701. As one example, the content authoring tool may enable the first user to determine the certain period of time by selecting a given sequence of media interactions that the digital character 702 may be configured to perform over a period of time in a given conversational session of the visual conversation application, such as in response to a question asked by a user during a conversational session of the visual conversation application. As another example, the content authoring tool may enable the first user to determine the certain period of time by selecting a given sequence of media interactions that the digital character 702 has performed over a period of time in a past conversational session of the visual conversation application. In such an example, the first user may select the given sequence of media interactions from among historical conversational session data that may be presented as part of the example view 700 (not shown). Additionally, the historical conversational session data may be retrieved by the authoring computing device 102 from the back-end platform 104, for example from a data storage of the back-end platform 104, such as the data storage 204 shown in FIG. 2.

Further, the preview portion 701 may enable the first user to determine a time, over the course of the certain period of time, from which the first user may edit (e.g., add to) certain media interactions of the digital character 702 at the determined time, as further described with respect to the timeline view portion 705. For example, while the preview portion 701 is visually showing how the digital character 702 will behave (or did behave in a historical conversational session of the visual conversation application) over the course of the certain period of time, the first user may select a frame of the preview portion 701. Based on the user selecting the frame from the preview portion, the content authoring tool may determine the time during the course of the certain period of time that corresponds to the time that the user selected the frame of the preview portion 701.

In practice, the preview portion 701 may perform various other functionality as well.

The timeline view portion 705 may function to (i) show an "at a glance" view of various types of media interactions of the digital character 702 that may be performed by the digital character 702 at various times over the course of the certain period of time determined by the first user (as previously described), to (ii) enable the first user to determine a time, over the course of the certain period of time, from which to edit (e.g., add to) certain media interactions of the digital character 702, as well as to (iii) enable the first user of the authoring computing device 102 to edit the certain media interactions of the digital character 702 at the determined time.

In practice, the timeline view portion 705 may show the "at a glance" view of various types of media interactions of the digital character 702 in various ways. As one possibility, the timeline view portion 705 may include various highlights that each show a respective timeline for a respective type of media interaction that indicates at what times during the certain period of time the digital character 702 is configured to perform media interactions of the respective type. One such highlight may be a media highlight 706, which may display an "at a glance" view of any media items (such as the media item 704) that may be presented along with the digital character 702 during the certain period of time. Another such highlight may be an animation highlight 708, which may display an "at a glance" view of any animations that the digital character 702 is configured to perform during the certain period of time. Yet another such highlight may be a pause highlight 710, which may display an "at a glance" view of edits made to how the digital character 702 is configured to speak certain content during the certain period of time. Still yet another such highlight may be a text highlight 712, which may display an "at a glance" view of the certain content that the digital character 702 is configured to speak during the certain period of time.

As shown, the animation highlight 708 includes two "Hand Point" media interactions that the digital character 702 is configured to perform, one between 3 seconds and 4 seconds into the certain period of time and another between 13 seconds and 16 seconds into the certain period of time. However, as may be appreciated, any of the highlights of the timeline view portion 705 (e.g., the media highlight 706, the animation highlight 708, the pause highlight 710, and/or the text highlight 712) may include any number of media interactions that the digital character 702 is configured to perform during the certain period of time. Further, in practice, the timeline view portion 705 may include more or fewer highlights than those shown.

The timeline view portion 705 may also include a timeline 714 and a scrubber 716 as part of the "at a glance" view. The timeline 714 may represent the certain period of time, and the scrubber 716 may, among other things described herein, indicate the passage of time while the preview portion 701 visually shows how the digital character 702 will behave (or did behave in a historical conversational session of the visual conversation application) over the course of the certain period of time.

Various other possibilities for how the timeline view portion 705 may show the "at a glance" view may exist.

Further, in practice, the timeline view portion 705 may enable the first user of the authoring computing device 102 to determine a time, over the course of the certain period of time, from which to edit (e.g., add to) certain media interactions of the digital character 702 in various ways. As one possibility, the content authoring tool may enable the first user to utilize the scrubber 716 to determine the time from the timeline 714, for example by selecting and dragging the scrubber 716 along the timeline 714. As another possibility, the content authoring tool may enable the first user to select a portion of the timeline 714 (or optionally a portion of the media highlight 706, the animation highlight 708, the pause highlight 710, and/or the text highlight 712) to determine the time, over the course of the certain period of time, from which to edit certain media interactions of the digital character 702. Optionally, the scrubber 716 may adjust to a portion of the timeline 714 that corresponds to the portion of the timeline 714 (or the portion of the media highlight 706, the animation highlight 708, the pause highlight 710, and/or the text highlight 712) selected by the first user.

Further yet, in practice, the timeline view portion 705 may enable the first user to edit (e.g., add to) the certain media interactions of the digital character 702 at the determined time in various ways. As one possibility, the first user may select the media highlight 706, and based on the first user selecting the media highlight 706, authoring computing device 102 may present, via the GUI of the content authoring tool, a view (e.g., the example view 500 of FIG. 5), from which the first user may (i) add/remove/edit the media item 704, (ii) add/remove/edit sub-elements of the media item 704, and/or (iii) add/remove/edit other media items for the visual conversation application that may take effect during the determined time. Other examples also exist.

As another possibility, the first user may select the animation highlight 708, and based on the first user selecting the media highlight 706, the authoring computing device 102 may present, via the GUI of the content authoring tool, a view (described in more detail with respect to FIGS. 8 and 9), from which the first user may edit media interactions comprising animations of digital motions that the digital character 702 may be configured to perform during the certain period of time.

As yet another possibility, the first user may select the pause highlight 710, and based on the first user selecting the media highlight 706, the authoring computing device 102 may present, via the GUI of the content authoring tool, a view (e.g., a view akin to the example view 600), from which the first user may edit a media interaction of the digital character 702. The media interaction may comprise a manner in which the digital character 702 may be configured to speak certain content during the certain period of time, and the first user may edit the media interaction by (i) editing pauses that the digital character 702 may be configured to take while speaking the certain content, as well as by (ii) editing the way that the digital character 702 pronounces certain content, as described with respect to FIG. 6.

The timeline view portion 705 may enable the first user to edit (e.g., add to) the certain media interactions of the digital character 702 at the determined time in various other possible ways as well.

Further, the first user may edit more than one type of media interaction of the digital character 702 at any given time, such that the digital character 702 may be configured to perform more than one type of media interaction at a single point in time. As one possibility, the first user may drag the scrubber 716 to a given time of the timeline 714 and then (i) edit an animation that the digital character 702 is configured to perform at the given time via selecting the animation highlight 708 as well as (ii) edit the content that the digital character 702 is configured to say at the given time via selecting the text highlight 712. Various other possibilities also exist.

Further, in practice, the example view 700 may be presented via the authoring computing device 102 at various times. As one possibility, the example view 700 may be presented via the authoring computing device 102 when the toggle 510 is switched to the "Visual" position. Other possibilities may also exist.

Figure 8:
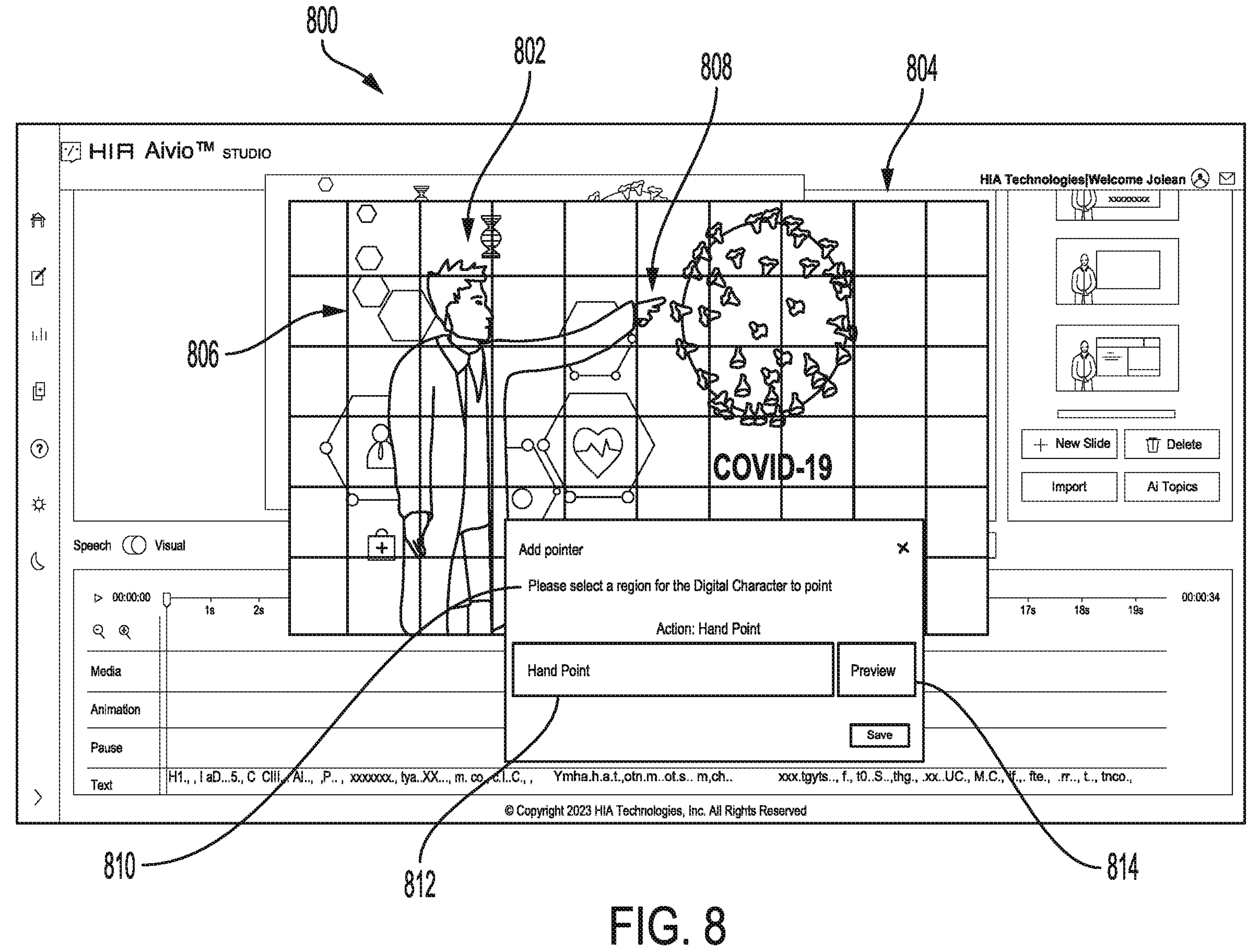
FIG. 8 is an example view of the GUI of the content authoring tool that may be presented via the authoring computing device and that may include selectable elements pertaining to animations for a digital character, in accordance with the present disclosure.
Figure 9:
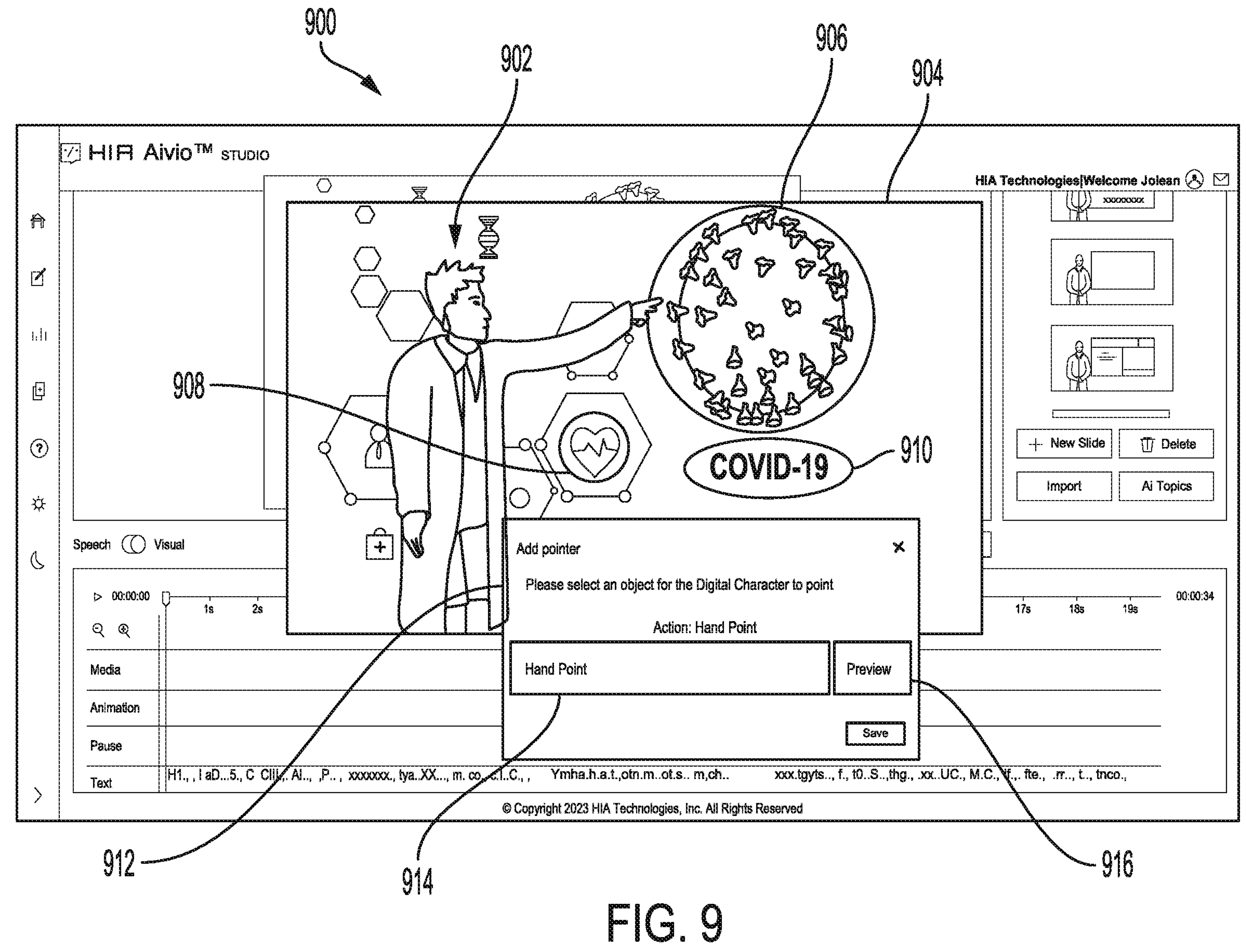
FIG. 9 is an example view of the GUI of the content authoring tool that may be presented via the authoring computing device and that may include selectable elements pertaining to animations for a digital character, in accordance with the present disclosure.

FIGS. 8 and 9 show different views of the content authoring tool that may be presented via the authoring computing device 102 that may enable the first user of the authoring computing device 102 to edit animations for digital actions that a digital character may be configured to perform during a conversational session of the visual conversation application. For example, the view of FIG. 8 and/or the view of FIG. 9 may be presented via the authoring computing device 102 in response to the first user selecting the animation highlight 708 in FIG. 7.

Starting with FIG. 8, an example view 800 of the GUI of the content authoring tool may be presented via the authoring computing device 102 and may include selectable elements pertaining to animations for a digital character, in accordance with the present disclosure. As mentioned, the example view 800 may be presented in response to the first user of the authoring computing device 102 selecting the animation highlight 708 in the example view 700 FIG. 7. Alternatively, there may be various other ways that the first user may navigate the content authoring tool to arrive at the example view 800.

The example view 800 may include (i) a digital character 802, which may be the digital character 702 or a different digital character, (ii) a media item 804, which is a presentation slide regarding COVID-19 in the example of FIG. 8, as well as (iii) various other elements that may enable the first user of the authoring computing device 102 to edit media interactions between the digital character 802 and the media item 804.

One function of the example view 800 may be to enable the first user of the authoring computing device 102 to select a target location for a media interaction of the digital character 802.

To enable this functionality, the example view 800 includes a grid 806 that overlays the media item 804. The grid 806 may include a number of selectable regions that the first user may select to determine a target location of a certain media interaction of the digital character 802. For example, as shown, the grid 806 is a 6×10 grid, with 60 selectable regions, each of which represents a candidate target location of a media interaction that may be performed by the digital character 802. The grid 806 may comprise more or fewer selectable regions, and the 6×10 size is only one example size for the grid 806. Further, in some implementations, the first user may adjust the size/granularity of the grid 806, such that the grid 806 may overlay a different portion of the media item 804, and may contain more or fewer selectable regions than the 60 selectable regions shown.

In FIG. 8, the grid 806 includes a selectable region 808, which may be the region selected by the first user as the target location of a certain media interaction of the digital character 802. In practice, the first user may select any of the selectable regions of the grid 806, and the selectable region 808 is intended to show only one example of a region selected by the first user.

Another function of the example view 800 may be to enable the first user of the authoring computing device 102 to select a media interaction of the digital character 802, which may be directed at the selectable region 808. To enable this functionality, the example view 800 includes a menu 810. In practice, the menu 810 may be presented upon user selection of the selectable region 808, or any other selectable region of the grid 806. The menu 810 may be presented at various times and according to various other triggers as well.

The menu 810 may include a media interaction selection box 812, which may enable the first user to select the media interaction of the digital character 802. As one possibility, the media interaction selection box 812 may comprise an editable text field, wherein the first user may provide input (e.g., typed text) to fill in the media interaction selection box 812 with a media interaction for the digital character 802 to perform. Additionally, or alternatively, the content authoring tool may present a number of selectable options for valid media interactions that may be based on the input provided by the first user (e.g., a list, a drop-down menu, etc.), from which the first user may select the media interaction for the digital character 802 to perform.

In practice, the media interaction selected by the first user for the digital character 802 may additionally cause the digital character 802 to perform other intermediate actions to enable the digital character 802 to perform the selected media interaction. For example, if the selected media interaction requires proximity to the selectable region 808 but the digital character 802 is not positioned such that the selectable region 808 is within the digital character's reach, then before performing the media interaction selected by the first user via the media interaction selection box 812, the digital character 802 may be configured to reposition itself so that the selectable region 808 is within the digital character's reach. For instance, the digital character may walk nearer to the selectable region 808. Various other examples are also possible.

The menu 810 may also include a preview button 814, which may enable the first user to preview the digital character 802 performing the media interaction selected by the first user via the media interaction selection box 812. For example, upon selection, the preview button 814 may cause the digital character 802 to begin to perform the selected media interaction. In practice, the preview may begin with the digital character 802 being positioned at a stopping position of a previous animation, and then showcase how the digital character 802 may transition from that stopping position to performing the selected media interaction, which, as explained, may involve the performance of certain intermediate interactions to enable the digital character 802 to perform the selected media interaction. The preview may include visual and/or audio components, so that the first user may preview, visually and/or audibly, how the digital character 802 may perform the selected media interaction in a conversational session of the visual conversation application.

As may be appreciated, the first user may select various types of media interactions for the digital character 802 to perform, as discussed above. The example media interaction "Hand Point" shown in FIG. 8 is only one example of various types of media interactions that the first user may select for the digital character 802.

Turning now to FIG. 9, an example view 900 of the GUI of the content authoring tool may be presented via the authoring computing device 102 and may include selectable elements pertaining to animations for a digital character, in accordance with the present disclosure. Like the example view 800, the example view 900 may be presented in response to the first user of the authoring computing device 102 selecting the animation highlight 708 in the example view 700 FIG. 7. Alternatively, there may be various other ways that the first user may navigate the content authoring tool to arrive at the example view 900.

The example view 900 may include (i) a digital character 902, which may be the digital character 802 or a different digital character, (ii) a media item 904, which is a presentation slide regarding COVID-19 in the example of FIG. 9, as well as (iii) various other elements that may enable the first user of the authoring computing device 102 to edit media interactions between the digital character 902 and the media item 904.

Similar to the example view 800, one function of the example view 900 may be to enable the first user of the authoring computing device 102 to select a target location for a media interaction of the digital character 902.

To enable this functionality, the media item 904 may include a number of sub-media items, some or all of which may be selectable by the first user to select a target location for a media interaction of the digital character 902. In this regard, sub-media items may include individually displayed elements within other media items, such as the individual icons displayed within the media item 904. For example, a first selectable sub-media item 906 of the media item 904 includes a visual representation of the COVID-19 virus, a second selectable sub-media item 908 includes a visual representation of a heart rate, and a third selectable sub-media item 910 includes a visual representation of the text "COVID-19", each of which may be selectable by the first user to select a target location for a media interaction of the digital character 902.

In practice, there may be more or fewer selectable sub-media items than those shown in the media item 904.

Further, in practice, the selectable sub-media items 906-910 (or other selectable target locations for a media interaction of the digital character 902) may be defined by the first user and/or identified by an automated process (such as an AI image and/or object detection module). For example, the content authoring tool may employ a computer vision library or the like to identify the selectable sub-media items 906-910 (or other selectable target locations for a media interaction of the digital character 902). For example, the content authoring tool may employ a computer vision library to identify from a video frame, such as previously described, (i) position coordinates and (ii) a time that define, respectively, where and at what time a given sub-media item to be identified from the video frame is presented via a given video. Other possibilities may also exist.

Another function of the example view 900 may be to enable the first user of the authoring computing device 102 to select a media interaction of the digital character 902, which may be directed at whichever of the selectable sub-media items 906-910 (or other target location) has been selected by the first user.

To enable this functionality, the example view 900 may include a menu 912, which may include a media interaction selection box 914 and a preview button 916. In practice, the menu 912, the media interaction selection box 914, and the preview button 916 may be similar to the menu 810, the media interaction selection box 812, and the preview button 814 of FIG. 8, respectively, with the exception that the media interaction of the digital character 902 that is added/edited/previewed via the menu 912 is targeted to a selected one of the sub-media items 906-910 or other target location selected by the first user (shown in FIG. 9 as the sub-media item 906), rather than the selectable region 808, as shown in FIG. 8.

Further, although the example views 800 and 900 show manners in which the first user may manually select media interactions and target locations for media interactions, in some implementations, the content authoring tool may utilize various features to perform these operations without requiring the first user's manual selections.

As one example, the content authoring tool may utilize computer vision features, such as the computer vision library described with respect to identifying sub-media items from video frames, to identify relevant regions or objects as target locations for the media interactions for the digital character. The content authoring tool may then use the identified regions or objects as a basis for determining a given media interaction for a digital character, which may be directed at a given identified region or a given identified object.

As another example, the content authoring tool may utilize natural language processing (NLP) features to identify relevant words or phrases (e.g., within a presentation slide) as target locations for the media interactions for the digital character. For example, the content authoring tool may utilize the NLP features to receive a natural language query from the second user and parse the query to identify (i) a media item or sub-media item that is being referenced by the query or (ii) a subject matter that is being referenced by the query that is associated with a media item or a sub-media item. In practice, the content authoring tool may identify the media item or subject matter even if the query does not exactly match text referencing the media item or subject matter. The content authoring tool may then use the identified media item or subject matter as a basis for determining a given media interaction for a digital character, which may be directed at (i) the identified media item or sub-media item or (ii) a media item or sub-media item associated with the identified subject matter. Various other examples may also exist.

Returning now to FIG. 4, at block 404, the back-end platform 104 may receive, from the authoring computing device 102, an indication of a media item to be presented via the end-user computing device 106 in a conversational session of the visual conversation application.

For instance, the first user of the authoring computing device 102 may provide an input selecting the media item in various ways. As one possibility, the first user may navigate to the example view 500 of FIG. 5 and select the media item 504 from the set of media items 506 (e.g., by scrolling through the media items of the set of media items 506 and identifying and selecting the media item 504 from among the various media items within the set of media items 506).

As another possibility, the media item 504 may not be a part of a set of media items present in the example view 500. Accordingly, the first user may select the AI topics icon 508 to view a number of AI topics, as discussed above. The first user may then identify and select, from among the number of AI topics presented, the set of media items 506 that includes the media item 504. Thereafter, the set of media items 506 may replace another set of media items that may have previously been present in the example view 500, and the first user may then select the media item 504 from the set of media items 506. In practice, there may be various other ways for the first user to identify and select the media item 504.

The authoring computing device 102 may then, based on the first user selecting the media item 504, transmit an indication of the media item 504 to the back-end platform 104. In practice, the indication of the media item 504 may be transmitted to the back-end platform 104 via the connection path between the authoring computing device 102 and the back-end platform 104 previously described.

At block 406, the back-end platform 104 may then receive, from the authoring computing device 102, an indication of a given media interaction comprising a type of engagement of a digital character with a media item. As described with regards to the FIGS. 5-9, there are various manners in which the first user of the authoring computing device 102 may select the given media interaction, as well as various types of media interactions that may be selected by the first user.

As one possible manner in which the first user may select the given media interaction, the first user may navigate to the example view 500 and edit content in the text box 512 so that the digital character 502 is configured to speak the content in the text box 512 in relation to the media item 504. As mentioned, there may be features within the content authoring tool to allow the user to indicate that the content of the text box 512 should be spoken by the digital character 502 to the media item 504 (e.g., another digital character), rather than to the second user of the end-user computing device 106.

As another possible manner in which the first user may select the given media interaction, the first user may navigate to the example view 600 to adjust the manner in which the digital character 502 pronounces certain content from the text box 512. As previously described, the example view 600 may additionally or alternatively enable the first user to adjust the manner in which the digital character 502 pauses at various points while speaking, such as between sentences, after commas, or after asking a question, among various other possibilities.

As yet another possible manner in which the first user may select the given media interaction, the first user may navigate to the example view 700, select one of the highlights of the timeline view portion 705 to select a particular type of media interaction (e.g., visual-related media interactions or audio-related media interactions), and from there may specify the given media interaction. As one example, the first user may select the animation highlight 708 to navigate to the example view 800 of FIG. 8 or the example view 900 of FIG. 9 to select the given media interaction, which may comprise an animation of digital motions that the digital character 502 may perform, as previously discussed. As another example, the first user may select the pause highlight 710 to navigate to the example view 600 of FIG. 6 to select the given media interaction, where, as discussed, the given media interaction includes a manner in which the digital character 502 pauses at various points while speaking specific content to the media item 504. As yet still another example, the first user may select the text highlight 712 to navigate to the text box 512 to select the given media interaction, where the given media interaction includes specific content that the digital character 502 is configured to speak in relation to the media item 504, and where the given media interaction is selected via inputting the specific content into the text box 512 as previously described.

The first user of the authoring computing device 102 may select the given media interaction in various other ways as well. Further, as mentioned, there may be various other types of media interactions than those described with respect to FIGS. 5-9 that may be selected by the first user.

In practice, the authoring computing device 102 may, based on the first user selecting the given media interaction, transmit an indication of the given media interaction to the back-end platform 104. Further, the indication of the given media interaction may be transmitted to the back-end platform 104 via the communication path between the authoring computing device 102 and the back-end platform 104 previously described.

At block 408, the back-end platform 104 may save the visual conversation application based on (i) the indication of the media item to be presented via the end-user computing device 106 in the conversational session of the visual conversation application and (ii) the indication of the given media interaction comprising the type of engagement of the digital character with the media item. For example, the back-end platform 104 may save the visual conversation application in memory, such as memory of the data storage 204 shown in FIG. 2. In practice, this may result in the given media interaction selected by the first user of the authoring computing device 102 being associated with the media item according to the first user's inputs. For example, the given media interaction may be time-associated with the media item based on the timing that the first user set up for the digital character to perform the given media interaction. As another example, the given media interaction may be location-associated with the media item based on the location (e.g., what portion of the media item) the first user set up the digital character to target for performing the given media interaction. Various other examples may also exist.

At block 410, the back-end platform 104 may then cause a conversational session of the visual conversation application to be presented via the end-user computing device 106 in a rendering phase. As discussed, the conversational session of the visual conversation application may include a digital character that has been created by the first user of the authoring computing device 102 as well as a media item that has been selected by the first user, and the digital character may be configured to engage with the media item in accordance with the given media interaction that was selected by the first user during the conversational session of the visual conversation application.

It should be noted that although the digital character has been described as being configured to interact with media items that are present with the digital character in a conversational session of the visual conversation application in accordance with a given media interaction, in some implementations, the digital character may additionally/alternatively be configured to interact with elements in a real-life environment where the second user of the end-user computing device 106 is positioned using augmented reality, virtual reality, and AI-based object identification. To this end, in some implementations, the visual conversation application may include the digital character overlaid in an augmented reality environment so that the digital character can interact with elements from the real-world environment. As one example, a representation of the digital character may be printed on a product package and may (i) appear to be "replaced" by a "living version" of the digital character or (ii) appear to jump off of the product package and to life, either of which may be triggered when the second user of the visual conversation application points a camera of the end-user computing device 106 toward the product package during a conversational session of the visual conversation application. As another example, the digital character may "bring to life" a representation of another object (e.g., another digital character) that may be displayed on a product package by "pulling" the additional object out of the product packaging, which may optionally result in the displayed representation of the additional object to be hidden from view while a 3D representation of the additional object is "pulled out" of the product packaging. As yet another example, the representation of the additional object may be located in a media item having the form of a presentation slide. In this example, "pulling" the additional object out of the media item may optionally result in the media item being removed from view (e.g., if the media item is a digital presentation slide, then the media item may be minimized). Further, in some implementations, the visual conversation application may include the digital character positioned in a virtual reality environment where the digital character can interact with elements from the virtual reality environment. Various other possibilities may also exist.

B. Example Rendering Phase

Figure 10:
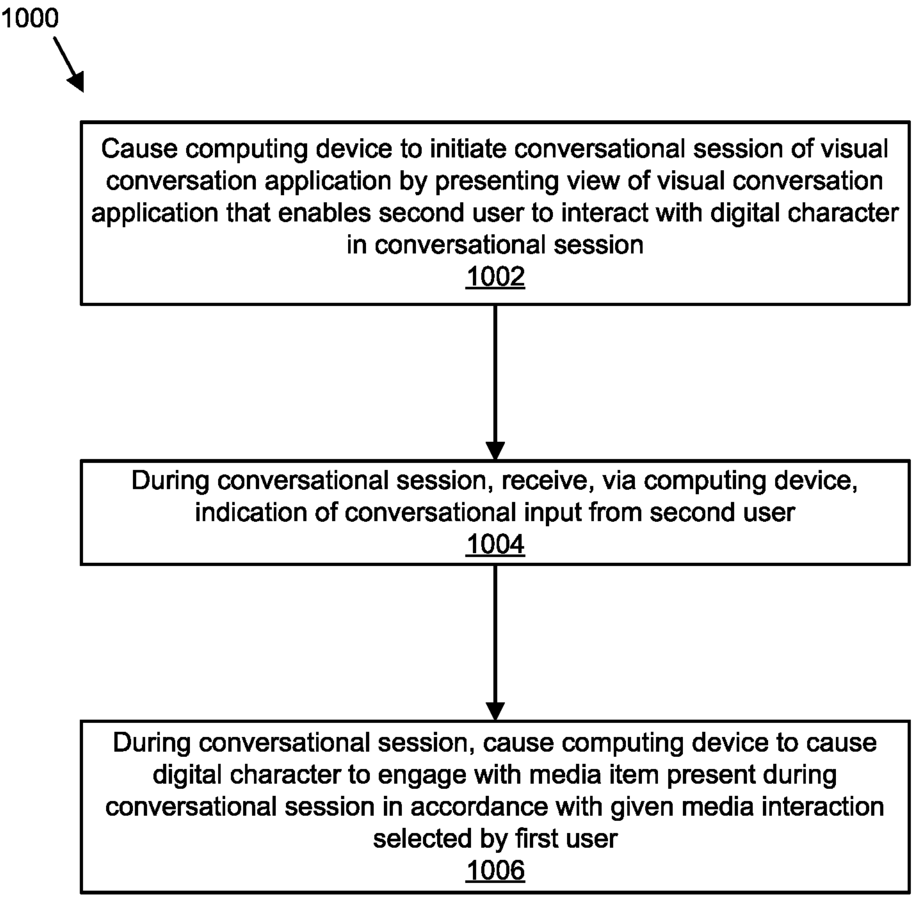
FIG. 10 is a flowchart that shows example operations that may be carried out in accordance with the present disclosure.

FIG. 10 is a flowchart 1000 that shows example operations that may be carried out by the back-end platform 104 to enable a user of the visual conversation application to interact with a digital character in a conversational session of a visual conversation application, in accordance with the present disclosure. Further, although the flowchart 1000 is described as being carried out by the back-end platform 104, in some implementations, the operations of the flowchart 1000 may be performed by the end-user computing device 106, the authoring computing device 102, or any other suitable computing device.

According to an example implementation, the rendering phase of the disclosed process may begin with the second user of the end-user computing device 106 accessing, via the end-user computing device 106, the visual conversation application created by the first user of the authoring computing device 102 as described. In practice, the second user may request access to the visual conversation application in various manners, some of which are described in more detail in U.S. Pat. No. 11,204,743.

At block 1002, after receiving a request from the end-user computing device 106 to access the visual conversation application, the back-end platform 104 may cause the end-user computing device 106 to initiate a conversational session of the visual conversation application by presenting a view of the visual conversation application that enables the second user of the end-user computing device 106 to interact with a digital character in the conversational session. The view of the visual conversation application may take various forms, some of which are described in more detail in U.S. Pat. No. 11,204,743. Further, as previously described, one or more media items may be included in the view of the visual conversation application along with the digital character.

At block 1004, over the course of the conversational session, the back-end platform 104 may receive, via the end-user computing device 106, an indication of conversational input from the second user. For example, the conversational input may include a question to the digital character (or perhaps to a media item present during the conversational session, for example in implementations where the media item takes the form of an additional digital character), an answer to a question asked by the digital character (or perhaps asked by the media item), or a remark to the digital character (or perhaps to the media item), among various other examples. The end-user computing device 106 may receive the conversational input via one or more microphones of the end-user computing device 106 directly, or via an external audio receiver that transmits audio data comprising the conversational input to the end-user computing device 106. An indication of the conversational input may then be transmitted to the back-end platform 104.

At block 1006, over the course of the conversational session, the back-end platform 104 may cause the end-user computing device 106 to cause the digital character to engage with a media item present during the conversational session in accordance with a given media interaction selected by the first user of the authoring computing device 102, as previously discussed. For example, if the second user of the end-user computing device 106 asks the digital character a question about a certain topic, the digital character may respond by pointing to a particular portion of a media item taking the form of a presentation slide that contains information relevant to the second user's question. As mentioned, this is only one possible kind of media interaction that the digital character may be configured to engage with the media item in accordance with, and only one possible kind of media item that may be present during the conversational session. As a non-exhaustive example, the media item may be a visual representation of a television, and the digital character may be configured to "turn on" the visual representation of the television via a visual representation of a remote or the like and navigate (e.g., by switching channels, fast forwarding, etc.) to a relevant portion of a video that contains information relevant to the question asked by the second user. As mentioned, various other kinds of media interactions and various other media items also exist.

FIGS. 4 and 10 include one or more operations, functions, or actions as illustrated by one or more operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowcharts shown in FIGS. 4 and 10, and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIGS. 4 and 10 may represent circuitry and/or machinery that is wired or arranged to perform the specific functions in the process.

One of ordinary skill in the art will appreciate that the back-end platform 104 may perform various other functions as well, which may depend in part on the manner in which the first user of the authoring computing device 102 interacts with the disclosed content authoring tool and/or the manner in which the second user of the end-user computing device 106 interacts with the visual conversation application created by the first user via the disclosed content authoring tool.

Further, while an example implementation of the authoring phase has been described above with respect to a first user (e.g., a professional) utilizing the authoring computing device 102, it should be understood that any individual having access to the disclosed content authoring tool may create the visual conversation application via any appropriate computing device. For example, in some implementations, a user may utilize the content authoring tool via the end-user computing device 106. Likewise, while an example implementation of the rendering phase has been described above with respect to a second user (e.g., a patient, a client, a consumer, etc.) utilizing the end-user computing device 106, it should be understood that any individual having access to the visual conversation application can interact with a digital character in a conversational session via any appropriate computing device. For example, the first user may access the visual conversation application and interact with a digital character in a conversational session via the authoring computing device 102, for example as a test or for personal use by the first user.

Further yet, while a single visual conversation application has been described, the content authoring tool may be utilized by various users, and may be utilized to create any number of visual conversation applications. For example, the first user may create a first given visual conversation application via the authoring computing device 102, and may also, perhaps via the same authoring computing device 102, access a second given visual conversation application as an end user, which may have been created by the first user or another user using the content authoring tool via a given computing device.

Further yet, while some example conversational sessions have been described with respect to a single user (e.g., the second user) and a digital character, it should be understood that a conversational session of a given visual conversation application may involve multiple users that may interact with a given digital character during the same conversational session of the given visual conversation application.

Further yet, although various features of the content authoring tool have at times been described as being usable by a medical professional, in practice, the content authoring tool may be capable of being used by users for any conversational purpose. For example, although the various example views of the content authoring tool shown in FIGS. 5-9 have been described with functionality relevant to medical practitioners, other views of the content authoring tool may be accessible to users of the content authoring tool having a different background (e.g., banker, attorney, etc.) or different conversational goals that may not be related to their background. Accordingly, such other views of the content authoring tool may be similar to the example views described with respect to FIGS. 5-9, with the exception that the content and functionality shown and enabled by those other views may be relevant to the conversational goals of the user accessing the content authoring tool.

V. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "users," or other entities, this is for purposes of example and explanation only. Claims should not be construed as requiring action by such actors unless explicitly recited in claim language.

What is claimed is:

1. A computing system comprising:

a network interface;

at least one processor;

at least one non-transitory computer-readable medium; and program instructions stored on the at least one non-transitory computer-readable medium that are executable by the at least one processor such that the computing system is configured to:

cause a graphical user interface (GUI) of a content authoring tool for creating a visual conversation application to be presented via a first computing device, the GUI comprising one or more selectable media interactions for configuring digital character interactions with media items, wherein the digital character is configured to interact with a user of a second computing device in a conversational session of the visual conversation application;

receive, from the first computing device, an indication of a media item to be presented in the conversational session of the visual conversation application, wherein the media item is not a digital character;

receive, from the first computing device, an indication of a given media interaction of the one or more selectable media interactions, wherein the given media interaction comprises a type of engagement of the digital character with the media item;

receive, from the first computing device, an indication of a given portion of the media item that defines the given portion of the media item as a target location for the given media interaction; and cause the conversational session to be presented via the visual conversation application on the second computing device, wherein the visual conversation application is configured to, during the conversational session:

present the digital character and the media item;

while the digital character and the media item are being presented, receive, from the user of the second computing device, a query that is directed to the digital character;

select the given media interaction as being responsive to the query; and cause the digital character to respond to the query directed to the digital character by engaging with the media item in accordance with the given media interaction, wherein the engagement with the media item in accordance with the given media interaction is directed to the given portion of the media item, and wherein the given portion of the media item includes information relevant to the query.

2. The computing system of claim 1, wherein the GUI further comprises a set of media items comprising the media item, and wherein the program instructions that are executable by the at least one processor such that the computing system is configured to receive the indication of the media item comprise program instructions that are executable by the at least one processor such that the computing system is configured to:

receive the indication of the media item based on a user of the first computing device selecting the media item from the set of media items via the first computing device.

3. The computing system of claim 1, wherein the given media interaction comprises a verbal type of engagement of the digital character with the media item.

4. The computing system of claim 1, wherein the given media interaction comprises a visual type of engagement of the digital character with the media item.

5. The computing system of claim 1, wherein the media item comprises a representation of one or both of textual content or image content.

6. The computing system of claim 5, wherein the media item comprises a representation of a slide presentation.

7. The computing system of claim 6, wherein the given media interaction comprises the digital character editing content that is displayed by the media item.

8. The computing system of claim 1, wherein the media item comprises video content.

9. The computing system of claim 8, wherein the given media interaction comprises the digital character manipulating playback of the video content.

10. The computing system of claim 1, wherein the given media interaction comprises the digital character acting out an action that is described in the media item.

11. The computing system of claim 1, wherein the given portion of the media item comprises a sub-media item of the media item that takes the form of an individually displayed element within the media item.

12. The computing system of claim 1, further comprising program instructions stored on the at least one non-transitory computer-readable medium that, when executed by the at least one processor, cause the computing system to:

cause the GUI of the content authoring tool to include a grid that is overlaying the media item, wherein the grid includes a plurality of selectable regions;

wherein the indication of the given portion of the media item comprises an indication of a user selection of a given selectable region of the plurality of selectable regions that corresponds to the given portion of the media item.

13. A non-transitory computer-readable medium, wherein the non-transitory computer-readable medium is provisioned with program instructions that, when executed by at least one processor, cause a computing system to:

cause a graphical user interface (GUI) of a content authoring tool for creating a visual conversation application to be presented via a first computing device, the GUI comprising one or more selectable media interactions for configuring digital character interactions with media items, wherein the digital character is configured to interact with a user of a second computing device in a conversational session of the visual conversation application;

receive, from the first computing device, an indication of a media item to be presented in the conversational session of the visual conversation application, wherein the media item is not a digital character;

receive, from the first computing device, an indication of a given media interaction of the one or more selectable media interactions, wherein the given media interaction comprises a type of engagement of the digital character with the media item;

receive, from the first computing device, an indication of a given portion of the media item that defines the given portion of the media item as a target location for the given media interaction; and cause the conversational session to be presented via the visual conversation application on the second computing device, wherein the visual conversation application is configured to, during the conversational session:

present the digital character and the media item;

while the digital character and the media item are being presented, receive, from the user of the second computing device, a query that is directed to the digital character;

select the given media interaction as being responsive to the query; and cause the digital character to respond to the query directed to the digital character by engaging with the media item in accordance with the given media interaction, wherein the engagement with the media item in accordance with the given media interaction is directed to the given portion of the media item, and wherein the given portion of the media item includes information relevant to the query.

14. The non-transitory computer-readable medium of claim 13, wherein the GUI further comprises a set of media items comprising the media item, and wherein the program instructions that, when executed by the at least one processor, cause the computing system to receive the indication of the media item comprise program instructions that, when executed by the at least one processor, cause the computing system to:

receive the indication of the media item based on a user of the first computing device selecting the media item from the set of media items via the first computing device.

15. The non-transitory computer-readable medium of claim 13, wherein the given media interaction comprises a verbal type of engagement of the digital character with the media item.

16. The non-transitory computer-readable medium of claim 13, wherein the given media interaction comprises a visual type of engagement of the digital character with the media item.

17. A method carried out by a computing system, the method comprising:

causing a graphical user interface (GUI) of a content authoring tool for creating a visual conversation application to be presented via a first computing device, the GUI comprising one or more selectable media interactions for configuring digital character interactions with media items, wherein the digital character is configured to interact with a user of a second computing device in a conversational session of the visual conversation application;

receiving, from the first computing device, an indication of a media item to be presented in the conversational session of the visual conversation application, wherein the media item is not a digital character;

receiving, from the first computing device, an indication of a given media interaction of the one or more selectable media interactions, wherein the given media interaction comprises a type of engagement of the digital character with the media item;

receiving, from the first computing device, an indication of a given portion of the media item that defines the given portion of the media item as a target location for the given media interaction; and causing the conversational session to be presented via the visual conversation application on the second computing device, wherein the visual conversation application is configured to, during the conversational session:

present the digital character and the media item;

while the digital character and the media item are being presented, receive, from the user of the second computing device, a query that is directed to the digital character;

select the given media interaction as being responsive to the query; and cause the digital character to respond to the query directed to the digital character by engaging with the media item in accordance with the given media interaction, wherein the engagement with the media item in accordance with the given media interaction is directed to the given portion of the media item, and wherein the given portion of the media item includes information relevant to the query.

18. The method of claim 17, wherein the GUI further comprises a set of media items comprising the media item, and wherein receiving the indication of the media item comprises:

receiving the indication of the media item based on a user of the first computing device selecting the media item from the set of media items via the first computing device.

19. The method of claim 17, wherein the given media interaction comprises a verbal type of engagement of the digital character with the media item.

20. The method of claim 17, wherein the given media interaction comprises a visual type of engagement of the digital character with the media item.

* * * * *